(12) United States Patent
Serbest et al.

(10) Patent No.: US 9,204,360 B2
(45) Date of Patent: Dec. 1, 2015

(54) SYSTEMS, METHODS, AND ARTICLES OF MANUFACTURE TO DETERMINE CONNECTIVITY

(71) Applicant: AT&T Intellectual Property I, L.P., Atlanta, GA (US)

(72) Inventors: Yetik Serbest, Austin, TX (US); Meei-Ling Chen, San Ramon, CA (US); Andrew Jeffery Hall, Round Rock, TX (US); Yun Hee Kim, Dublin, CA (US); Nam H. Nguyen, San Jose, CA (US); Haibo Zhang, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 235 days.

(21) Appl. No.: 13/708,589

(22) Filed: Dec. 7, 2012

(65) Prior Publication Data

US 2014/0160977 A1    Jun. 12, 2014

(51) Int. Cl.
    *H04W 40/02*    (2009.01)
(52) U.S. Cl.
    CPC .................................. *H04W 40/02* (2013.01)

(58) Field of Classification Search
    None
    See application file for complete search history.

(56) References Cited

U.S. PATENT DOCUMENTS

| | | | |
|---|---|---|---|
| 2002/0068584 A1* | 6/2002 | Gage et al. | 455/456 |
| 2006/0153200 A1* | 7/2006 | Filsfils et al. | 370/395.31 |
| 2012/0155321 A1* | 6/2012 | Yang et al. | 370/254 |

OTHER PUBLICATIONS

Ralf Nyren, Interfacing Node B and RNC by tunneling ATM over IP for test and verification purpose, Nov. 30, 2007, (46 Pages).

* cited by examiner

*Primary Examiner* — Ian N Moore
*Assistant Examiner* — Brian T Le
(74) *Attorney, Agent, or Firm* — Hanley, Flight & Zimmerman, LLC.

(57) ABSTRACT

Systems, methods, and articles of manufacture to determine connectivity are disclosed. An example method includes identifying, with a processor, a radio network controller serving a NodeB based on a configuration of the NodeB; identifying, with the processor, a set of intermediate nodes forming a pathway between the radio network controller and the NodeB; and storing the pathway between the radio network controller and the NodeB based on the radio network controller and the intermediate nodes.

16 Claims, 19 Drawing Sheets

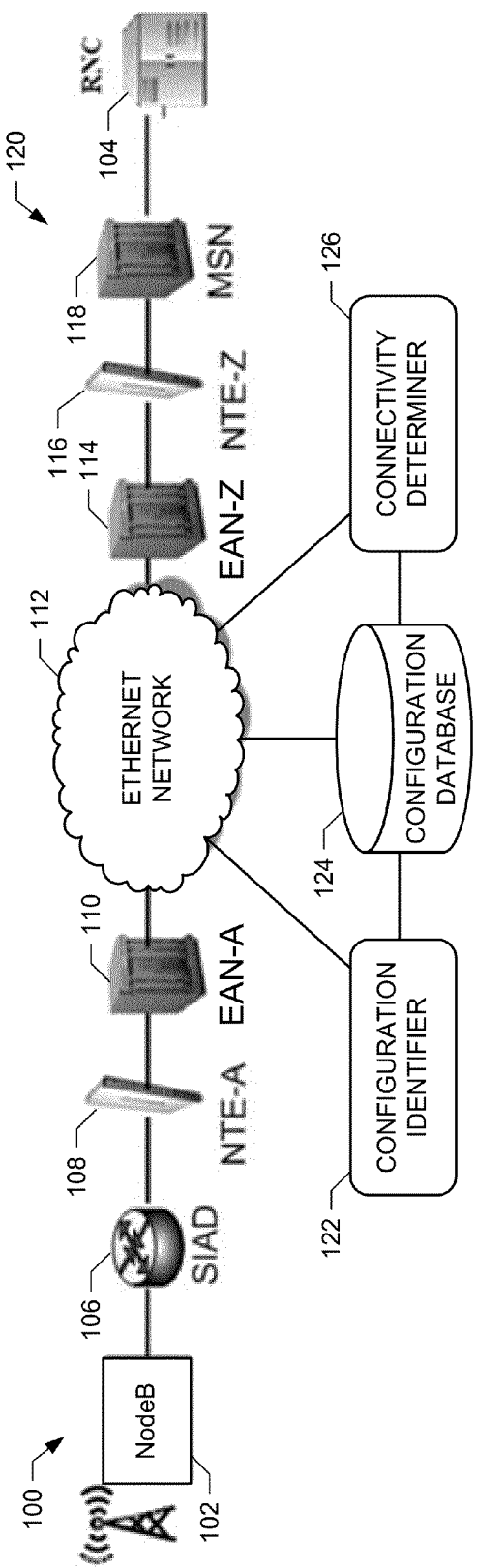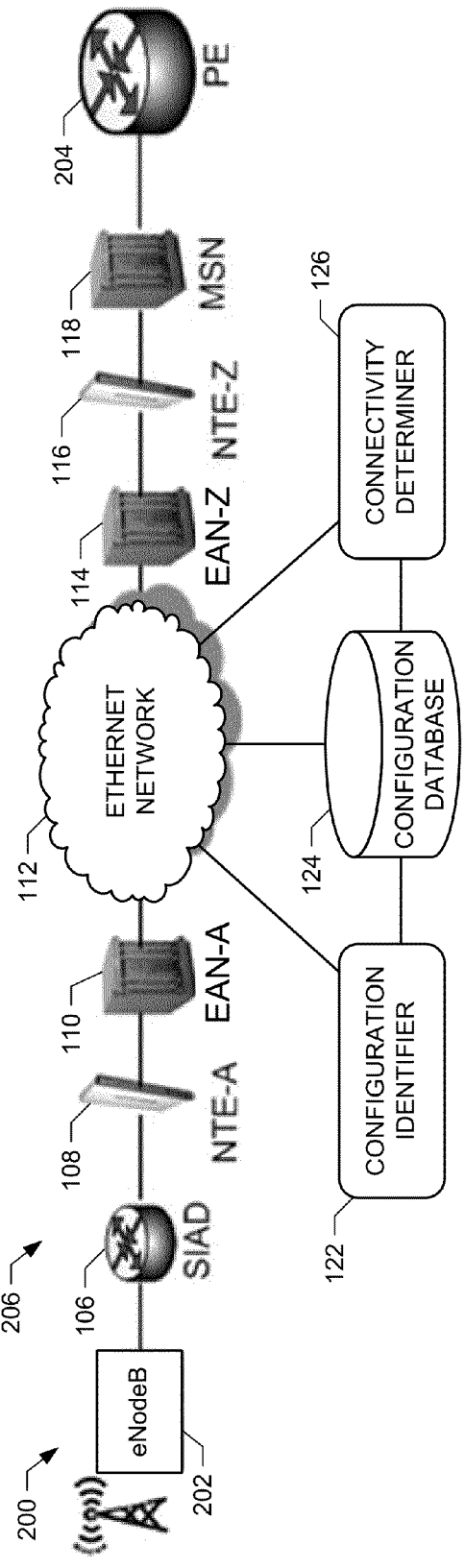

SYSTEMS, METHODS, AND ARTICLES OF MANUFACTURE TO DETERMINE CONNECTIVITY

FIELD OF THE DISCLOSURE

This disclosure relates generally to network management, and, more particularly, to systems, methods, and articles of manufacture to determine connectivity.

BACKGROUND

Mobile transceiver stations are connected to backbone networks to provide data to mobile devices. While some previous generation transceiver stations were primarily controlled by network elements and did not include much intelligence, newer transceiver stations (e.g., long-term evolution, or LTE, transceiver stations) include higher levels of processing and intelligence to serve data to mobile devices.

BRIEF DESCRIPTION OF THE DRAWINGS

FIG. 1 is a block diagram of an example system constructed in accordance with the teachings of this disclosure to determine connectivity between a NodeB node and a radio network controller.

FIG. 2 is a block diagram of an example system constructed in accordance with the teachings of this disclosure to determine connectivity between an eNodeB node and a provider edge router.

Wherever possible, the same reference numbers will be used throughout the drawing(s) and accompanying written description to refer to the same or like parts.

DETAILED DESCRIPTION

Figure 3:
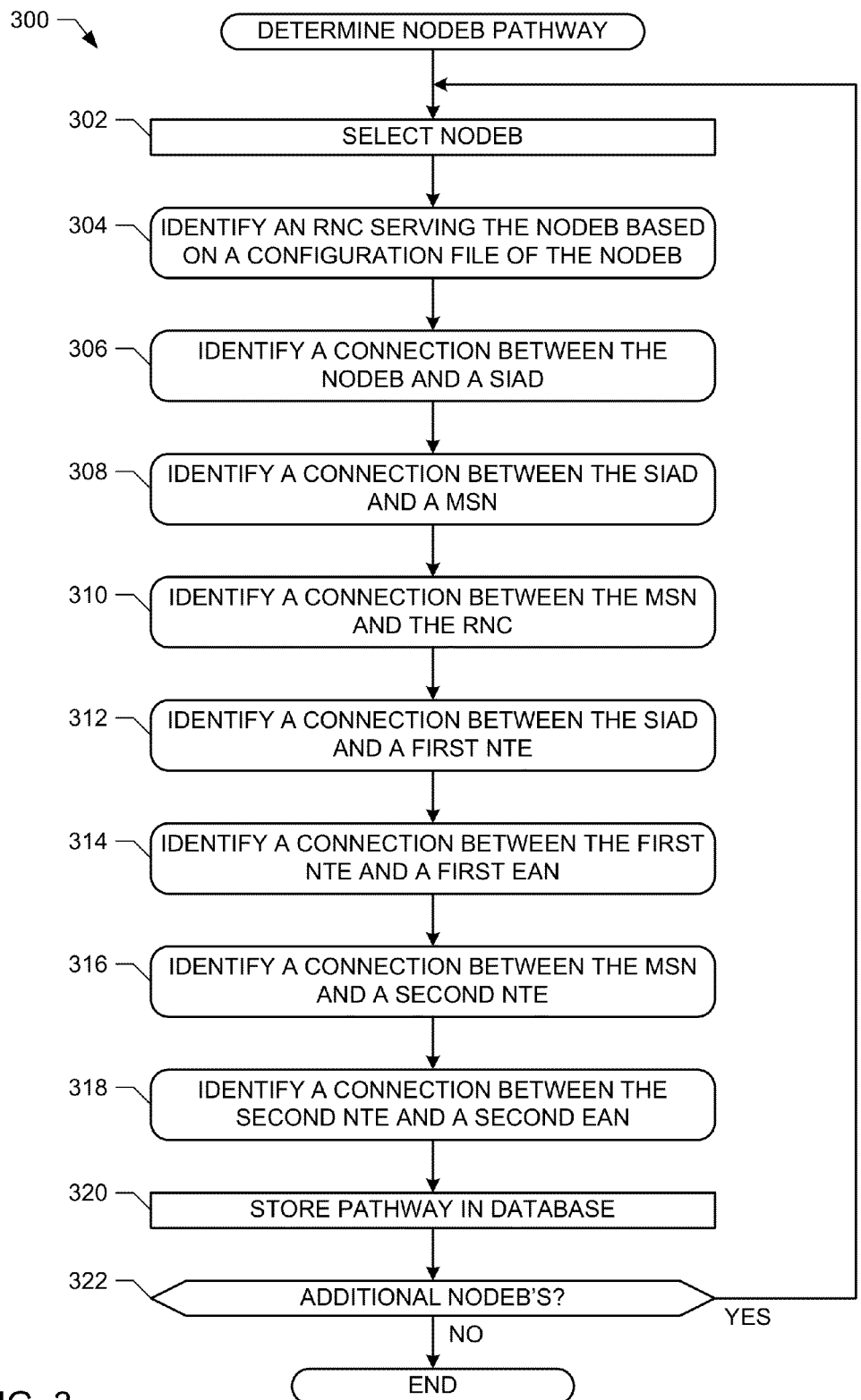
FIG. 3 is a flowchart representative of example machine readable instructions that may be executed to determine a pathway between a NodeB and a radio network controller.

Mobility network operators, deploying Ethernet-to-the-cell-site (ETTCS) technology, may use an end-to-end configuration map from a cell site to a core network serving the cell site. Known methods to identify connectivity between a cell site (e.g., a NodeB node, an enhanced NodeB (eNodeB) node) and the core network are labor-intensive. These known methods are subject to misconfiguration and/or difficulty in accurately identifying the configuration, because current ETTCS architecture includes both virtual local area network (VLAN) and Internet protocol (IP)-based solutions, and because it is common to reuse IP addresses for similar nodes in different geographical areas.

As used herein, the term "connectivity" may refer to planned connectivity (e.g., the end-to-end configuration intended by a network planner), configured connectivity (e.g., the end-to-end configuration implemented in the network), and/or actual connectivity (e.g., whether end-to-end communication can occur at any given time, based on the respective status of elements and/or pathways between the endpoints).

In known communication systems, network nodes are deployed and configured by specifying configuration files for the network nodes. The configuration file information may be similar to a programming language that is understood by the network nodes. The commands, procedures, and/or data provided in the configuration file information controls the operation of the network nodes. Errors in the configuration file data may cause connectivity problems in known networks. In some known networks, configurations include descriptions that provide a summary of the configuration of the node. Example methods, apparatus, and articles of manufacture disclosed herein consider these descriptions to be untrustworthy, and do not necessarily rely on them for determining connectivities.

Example systems, methods, and articles of manufacture disclosed herein determine connectivity between a transceiver station, such as a NodeB or an enhanced NodeB (eNodeB), and a backhaul node such as a radio network controller (RNC) or a provider edge (PE) router. Example methods, apparatus, and articles of manufacture disclosed herein enable rapid and accurate determinations of the end-to-end connectivity between cell site elements and core network elements. Example methods, apparatus, and articles of manufacture may be used in ETTCS architectures utilizing Layer-2 (e.g., VLAN) and/or layer-3 (e.g., IP) connectivity solutions. Example methods, apparatus, and articles of manufacture determine the end-to-end configuration for a particular cell site, which may then be used to diagnose connectivity issues and/or to audit actual configurations against planned configurations.

In contrast to known methods, example methods, apparatus, and articles of manufacture disclosed herein provide rapid, efficient access to a deployed end-to-end configuration for a network user or operator. Some such example methods, apparatus, and articles of manufacture may be used to audit key network parameters such as an end-to-end Maximum Transmission Unit (MTU) and/or for inventory system auditing to help correct inventory system errors.

FIG. 1 is a block diagram of an example system 100 to determine connectivity between a NodeB node 102 and a radio network controller (RNC) 104. The example system 100 may be a portion of a larger $3^{rd}$ generation (3G) mobile network (e.g., UTRAN) to provide mobile communication services to mobile devices.

In the example system 100 of FIG. 1, the NodeB 102 is communicatively coupled to the RNC 104 via a smart integrated access device (SIAD) 106, first network termination equipment (NTE-A) 108, a first Ethernet aggregation node (EAN-A) 110 (e.g., an Internet protocol aggregator (IPAG)), an Ethernet network 112, a second Ethernet aggregation node (EAN-Z) 114, second network termination equipment (NTE-Z) 116, and a mobile service node (MSN) 118. The example SIAD 106, the example NTE-A 108, the example EAN-A 110, the Ethernet network 112, the example EAN-Z 114, the example NTE-Z 116, and the example MSN 118 form an intermediate pathway 120 between the NodeB 102 and the RNC 104. Each of the example nodes 102-118 of FIG. 1 is configured via a respective configuration file.

The example system 100 of FIG. 1 further includes a configuration identifier 122, a configuration database 124, and a connectivity determiner 126. The example configuration identifier 122 determines the configurations of the elements 102-118 to determine an association of the NodeB 102 and the RNC 104 and to determine the intermediate pathway 120. The example configuration identifier 122 of FIG. 1 stores the configurations and the intermediate pathway 120 in the configuration database 124. An example method that may be performed by the configuration identifier 122 of FIG. 1 to determine the configurations and the pathway 120 of FIG. 1 is described below with reference to FIG. 3.

In some examples, the configuration identifier 122 determines the association between the NodeB 102 and the RNC 104 prior to determining the intermediate pathway 120. To determine the association of the NodeB 102 and the RNC 104, the example configuration identifier 122 of FIG. 1 accesses the configuration file of the NodeB 102. Based on the association between the NodeB 102 and the RNC 104, the configuration identifier 122 of the illustrated example determines the intermediate pathway 120 by determining a pathway between the NodeB 102 and the SIAD 106, a pathway between the SIAD 106 and the MSN 118, a pathway between the RNC 104 and the MSN 118, a pathway between the SIAD 106 and the NTE-A 108, a pathway between the NTE-A 108 and the EAN-A 110, a pathway between the MSN 118 and the NTE-Z 116, and a pathway between the NTE-Z 116 and the EAN-Z 114. The configuration identifier 122 of the illustrated example stores the intermediate pathway 120 in the configuration database 124 in association with the NodeB 102 and/or generates an exception report if portion(s) of the intermediate pathway 120 are misconfigured.

The example connectivity determiner 126 of FIG. 1 tests the actual connectivity between the NodeB 102 and the RNC 104. To test the connectivity, the connectivity determiner 126 of the illustrated example accesses the configuration database 124 to determine, for the NodeB 102, the associated RNC 104 and the intermediate pathway 120 between the NodeB 102 and the associated RNC 104. In some examples, the connectivity determiner 126 requests the configuration identifier 122 to identify the end-to-end configured connectivity between the NodeB 102 and the RNC 104 (e.g., when the configuration database 124 does not include an end-to-end pathway). The example connectivity determiner 126 of the illustrated example provides a report of the results of the connectivity test(s).

FIG. 2 is a block diagram of an example system 200 to determine connectivity between an eNodeB node 202 and a provider edge (PE) router 204. The example system 200 may be a portion of a larger $4^{th}$ generation (4G) mobile network (e.g., long term evolution (LTE)) to provide mobile communication services to mobile devices.

The example eNodeB 202 and the example PE router 204 are communicatively coupled via the example SIAD 106, the example NTE-A 108, the example EAN-A 110, the Ethernet network 112, the example EAN-Z 114, the example NTE-Z 116, and the example MSN 118, to form an intermediate pathway 206. The example system 200 of FIG. 2 further includes the example configuration identifier 122, the example configuration database 124, and the example connectivity determiner 126 of FIG. 1. Because many of the elements of the example of FIG. 1 are similar to elements in the example of FIG. 2, like reference numbers are used to refer to like elements. This numbering convention is employed throughout this description to reduce redundant description.

As described above with reference to FIG. 1, the configuration identifier 122 determines the configurations of the elements 202, 204, and 106-118 to determine an association of the eNodeB 202 and the PE 204 and to determine the intermediate pathway 206. To determine the pathway between the eNodeB 202 and the PE 204, the example configuration identifier 122 determines a pathway between the eNodeB 202 and the SIAD 106, determines a pathway between the SIAD 106 and the MSN 118, determines a pathway between the MSN 118 and the PE 204, a pathway between the SIAD 106 and the NTE-A 108, a pathway between the NTE-A 108 and the EAN-A 110, a pathway between the MSN 118 and the NTE-Z 116, and a pathway between the NTE-Z 116 and the EAN-Z 114.

The example configuration identifier 122 of FIG. 2 stores the configurations and the intermediate pathway 206 in the configuration database 124. An example method that may be performed by the configuration identifier 122 of FIG. 2 to determine the configurations and the pathway 206 of FIG. 2 is described below with reference to FIG. 4.

At a later time, the example connectivity determiner 126 of the illustrated example is to determine the connectivity of the eNodeB 202. The example connectivity determiner 126 of the illustrated example accesses the configuration database 124 to determine the pathway 206 between the eNodeB 202 and the PE 204. For each pair of adjacent elements 202, 204, 106-118 in the pathway 206, the example connectivity determiner 126 of the illustrated example determines whether the pair of adjacent elements has an active connection.

While example manners of implementing the systems 100 and 200 have been illustrated in FIGS. 1 and 2, one or more of the elements, processes and/or devices illustrated in FIGS. 1 and 2 may be combined, divided, re-arranged, omitted, eliminated and/or implemented in any other way. Further, the example configuration identifier 122, the example configuration database 124, the example connectivity determiner 126 and/or, more generally, the example systems 100, 200 of FIGS. 1 and/or 2 may be implemented by hardware, software, firmware and/or any combination of hardware, software and/or firmware. Thus, for example, any of the example configuration identifier 122, the example configuration database 124, the example connectivity determiner 126 and/or, more generally, the example systems 100, 200 of FIGS. 1 and/or 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example configuration identifier 122, the example configuration database 124, and/or the example connectivity determiner 126 are hereby expressly defined to include a tangible computer readable medium such as a memory, DVD, CD, Blu-ray, etc. storing the software and/or firmware. Further still, the example configuration identifier 122, the example configuration database 124, and/or the example connectivity determiner 126 of FIGS. 1 and/or 2 may include one or more elements, processes and/or devices in addition to, or instead of, those illustrated in FIGS. 1 and/or 2, and/or may include more than one of any or all of the illustrated elements, processes and devices.

The example instructions 300-1300 of FIGS. 3-13 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device or storage disc (e.g., a magnetic storage disc, an optical storage disc) and to exclude propagating signals. Additionally or alternatively, the example processes of FIGS. 3-13, 15-16, and 18 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disc (e.g., a magnetic storage disc, an optical storage disc) and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Flowcharts representative of example machine readable instructions for implementing the configuration identifier 122, the configuration database 124, and/or the connectivity determiner 126 of FIGS. 1 and/or 2 are shown in FIGS. 3-13. In this example, the machine readable instructions comprise a program for execution by a processor such as the processor 1912 shown in the example processor platform 1900 discussed below in connection with FIG. 19. The program may be embodied in software stored on a tangible computer readable medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 3-13 many other methods of implementing the configuration identifier 122, the configuration database 124, and/or the connectivity determiner 126 of FIGS. 1 and/or 2 may alternatively be used. For example, the order of execution of the blocks may be changed, and/or some of the blocks described may be changed, eliminated, or combined. As used herein, the phrases "causing the processor to perform operations" and/or "causing the processor to" can include the processor 1912 performing the operations and/or the processor 1912 instructing and/or directing other elements of an apparatus to perform the operations.

FIG. 3 is a flowchart representative of example machine readable instructions 300 to determine a pathway between a NodeB (e.g., the NodeB 102 of FIG. 1) and a radio network controller (e.g., the RNC 104). The example instructions 300 of FIG. 3 may be used to implement the configuration identifier 122 of FIG. 1. In some examples, the instructions 300 are performed regularly (e.g., daily, weekly, hourly, etc.) to update configurations of the elements 102-118 in the system 100.

The example configuration identifier 122 of FIG. 1 selects a NodeB (e.g., the NodeB 102 of FIG. 1) (block 302). The configuration identifier 122 of FIG. 1 identifies an RNC (e.g., the RNC 104) serving the NodeB 102 based on a configuration file of the NodeB 102 (block 304). For example, the configuration file of the NodeB 102 includes a statement having a unique identifier of the RNC 104, which may be located and interpreted by the configuration identifier 122 to determine the RNC 104. An example process to implement block 304 is described below with reference to FIG. 5.

The example configuration identifier 122 of FIG. 1 identifies a connection between the NodeB 102 and an integrated access device (e.g., the SIAD 106 of FIG. 1) (block 306). For example, the configuration identifier 122 may determine the identity of the SIAD 106 by comparing IP addresses in the configurations of the SIAD 106 and the NodeB 102 and/or based on comparing location identifier codes (e.g., Common Language Location Identifier (CLLI) codes or other identifiers). An example process to implement block 306 is described below with reference to FIG. 6.

The example configuration identifier 122 of FIG. 1 identifies a connection between the identified SIAD 106 and an MSN (e.g., the MSN 118 of FIG. 1) (block 308). For example, the configuration identifier 122 may identify an IP address of a virtual circuit connecting the SIAD 106 and the MSN 118 based on the configurations of the SIAD 106 and the MSN 118. The configuration identifier 122 may additionally or alternatively compare location identifier codes (e.g., CLLI codes) to select the MSN 118 from multiple possible MSNs. An example process to implement block 308 is described below with reference to FIG. 7.

The example configuration identifier 122 of FIG. 1 identifies a connection between the identified MSN 118 and the RNC 104 (block 310). For example, the system 100 may include multiple, cascading MSNs to provide the communications between the SIAD 106 to the RNC 104. The example configuration identifier 122 may determine whether the MSN 118 and the RNC 104 are on the same IP subnet and, if not, determines additional MSNs coupling the MSN 118 to the RNC based on location identifier codes (e.g., CLLI codes). An example process to implement block 310 is described below with reference to FIG. 8.

The example configuration identifier 122 of FIG. 1 identifies a connection between the SIAD 106 and a first NTE (e.g., NTE-A 108 of FIG. 1) (block 312). For example, the configuration identifier 122 may compare location identifier codes (e.g., CLLI codes) of the SIAD 106 and the NTE-A 108 based on configurations of the SIAD 106 and the NTE-A 108. In some examples, the NTE-A 108 having a CLLI code that most closely matches the CLLI code of the SIAD 106 is determined to be the connected NTE-A 108. An example process to implement block 312 is described below with reference to FIG. 9.

The example configuration identifier 122 of FIG. 1 identifies a connection between the first NTE-A 108 and a first EAN (e.g., EAN-A 112 of FIG. 1) (block 314). For example, the configuration identifier 122 may determine a neighboring EAN of the first NTE-A 108 by comparing location identifier codes. An example process to implement block 314 is described below with reference to FIG. 10.

The example configuration identifier 122 identifies a connection between the MSN 118 and a second NTE (e.g., NTE-Z 116 of FIG. 1) (block 316). For example, the configuration identifier 122 may compare location identifier codes (e.g., CLLI codes) of the MSN 118 and the NTE-Z 116 based on configurations of the MSN 118 and the NTE-Z 116. In some examples, the NTE-Z 116 having a CLLI code that most closely matches the CLLI code of the MSN 118 is determined to be the connected NTE-Z 116. An example process to implement block 316 is described below with reference to FIG. 11.

The example configuration identifier 122 identifies a connection between the second NTE-Z 116 and a second EAN (e.g., EAN-Z 114 of FIG. 1) (block 318). For example, the configuration identifier 122 may determine a neighboring EAN of the second NTE-Z 116 by comparing location identifier codes. An example process to implement block 318 is described below with reference to FIG. 10.

The example configuration identifier 122 of FIG. 1 stores the determined pathway between the NodeB 102 and the RNC 104 in a database (e.g., the configuration database 124 of FIG. 1) (block 320). Example stored pathways specify the connections, associations, and/or intermediate pathways including the NodeB 102, the SIAD 106, the NTE-A 108, the EAN-A 110, the EAN-Z 114, the NTE-Z 116, the MSN 118, and the RNC 104. Thus, the stored pathway includes the end-to-end connection from the NodeB 102 to the RNC 104 that provides connectivity to the NodeB 102.

The example configuration identifier 122 of FIG. 1 determines whether pathways are to be determined for additional NodeBs in the system 100 (block 322). For example, the configuration identifier 122 may update the pathways for each of the NodeBs in the system 100 and/or for a subset of the NodeBs. If there are additional NodeBs for which pathways are to be determined (block 322), control returns to block 302 to select another NodeB. If there are no additional NodeBs (block 322), the example instructions 300 end.

Figure 4:
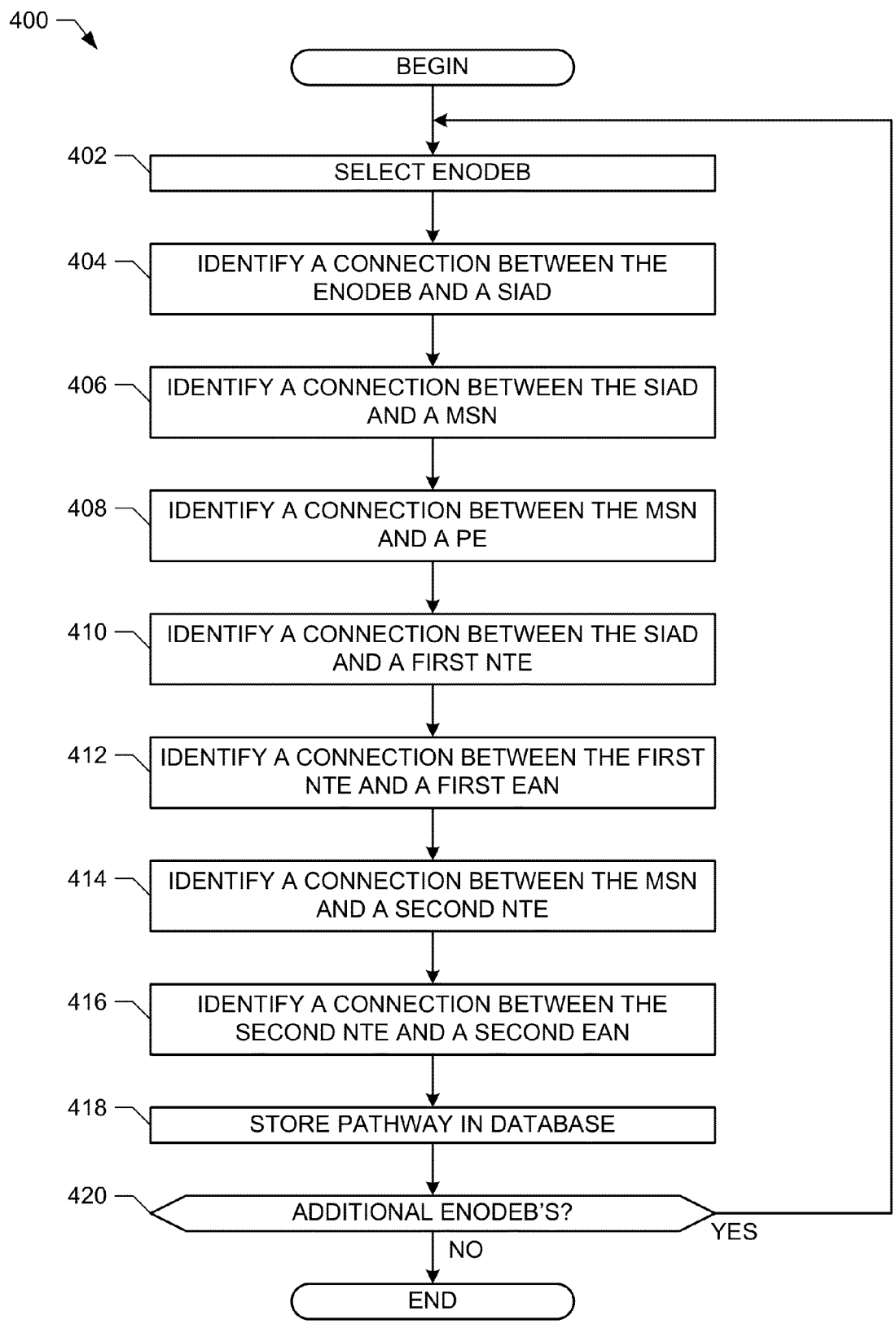
FIG. 4 is a flowchart representative of example machine readable instructions that may be executed to determine a pathway between an eNodeB and a provider edge router.

FIG. 4 is a flowchart representative of example machine readable instructions to determine a pathway between an eNodeB (e.g., the eNodeB 202 of FIG. 2) and a PE router (e.g., the PE 204 of FIG. 2). The example instructions 400 of FIG. 4 may be used to implement the configuration identifier 122 of FIG. 2.

The example configuration identifier 122 selects an eNodeB (e.g., the eNodeB 202 of FIG. 2) (block 402). The example configuration identifier 122 identifies a connection between the selected eNodeB 202 and an integrated access device (e.g., the SIAD 106 of FIG. 2) (block 404). For example, the configuration identifier 122 may determine the identity of the SIAD 106 by comparing IP addresses in the configurations of the SIAD 106 and the eNodeB 202 and/or based on comparing location identifier codes (e.g., CLLI codes or other identifiers). An example process to implement block 404 is described below with reference to FIG. 6.

The example configuration identifier 122 of FIG. 2 identifies a connection between the identified SIAD 106 and an MSN (e.g., the MSN 118 of FIG. 2) (block 406). For example, the configuration identifier 122 may identify an IP address of a virtual circuit connecting the SIAD 106 and the MSN 118 based on the configuration of the SIAD 106. The configuration identifier 122 may additionally or alternatively compare location identifier codes (e.g., CLLI codes) to select the MSN 118 from multiple possible MSNs. An example process to implement block 406 is described below with reference to FIG. 7.

The example configuration identifier 122 of FIG. 2 identifies a connection between the MSN 118 and a PE router serving the MSN 118 (e.g., the PE router 204 of FIG. 2) (block 408). For example, the configuration identifier 122 may analyze the configurations of the MSN 118 and the PE 204 to determine an association between the MSN 118 and the PE 204 for serving the eNodeB 202. An example process to implement block 408 is described below with reference to FIGS. 12A and 12B.

The example configuration identifier 122 of FIG. 2 identifies a connection between the SIAD 106 and a first NTE (e.g., NTE-A 108 of FIG. 2) (block 410). For example, the configuration identifier 122 may compare location identifier codes (e.g., CLLI codes) of the SIAD 106 and the NTE-A 108 based on configurations of the SIAD 106 and the NTE-A 108. In some examples, the NTE-A 108 having a CLLI code that most closely matches the CLLI code of the SIAD 106 is determined to be the connected NTE-A 108. An example process to implement block 410 is described below with reference to FIG. 9.

The example configuration identifier 122 of FIG. 2 identifies a connection between the first NTE-A 108 and a first EAN (e.g., EAN-A 110 of FIG. 2) (block 412). For example, the configuration identifier 122 may determine a neighboring EAN of the first NTE-A 108 by comparing location identifier codes. An example process to implement block 412 is described below with reference to FIG. 10.

The example configuration identifier 122 of FIG. 2 identifies a connection between the MSN 118 and a second NTE (e.g., NTE-Z 116 of FIG. 2) (block 414). For example, the configuration identifier 122 may compare location identifier codes (e.g., CLLI codes) of the MSN 118 and the NTE-Z 116 based on configurations of the MSN 118 and the NTE-A 108. In some examples, the NTE-A 108 having a CLLI code that most closely matches the CLLI code of the MSN 118 is determined to be the connected NTE-A 108. An example process to implement block 414 is described below with reference to FIG. 11.

The example configuration identifier 122 of FIG. 2 identifies a connection between the second NTE-Z 116 and a second EAN (e.g., EAN-Z 114 of FIG. 2) (block 416). For example, the configuration identifier 122 may determine a neighboring EAN of the second NTE-Z 116 by comparing CLLI codes. An example process to implement block 416 is described below with reference to FIG. 10.

The example configuration identifier 122 of FIG. 2 stores the determined pathway between the eNodeB 102 and the PE 204 in a database (e.g., the configuration database 124 of FIG. 2) (block 418). Example stored pathways specify the connections, associations, and/or intermediate pathways including the eNodeB 102, the SIAD 106, the NTE-A 108, the EAN-A 110, the EAN-Z 114, the NTE-Z 116, the MSN 118, and the PE 204. Thus, the stored pathway includes the end-to-end connection from the eNodeB 102 to the PE 204 that provides connectivity to the eNodeB 102.

The example configuration identifier 122 of FIG. 2 determines whether pathways are to be determined for additional eNodeBs in the system 100 (block 420). For example, the configuration identifier 122 may update the pathways for each of the eNodeBs in the system 100 and/or for a subset of the eNodeBs. If there are additional eNodeBs for which pathways are to be determined (block 420), control returns to block 402 to select another eNodeB. If there are no additional eNodeBs (block 420), the example method 400 ends.

Figure 5:
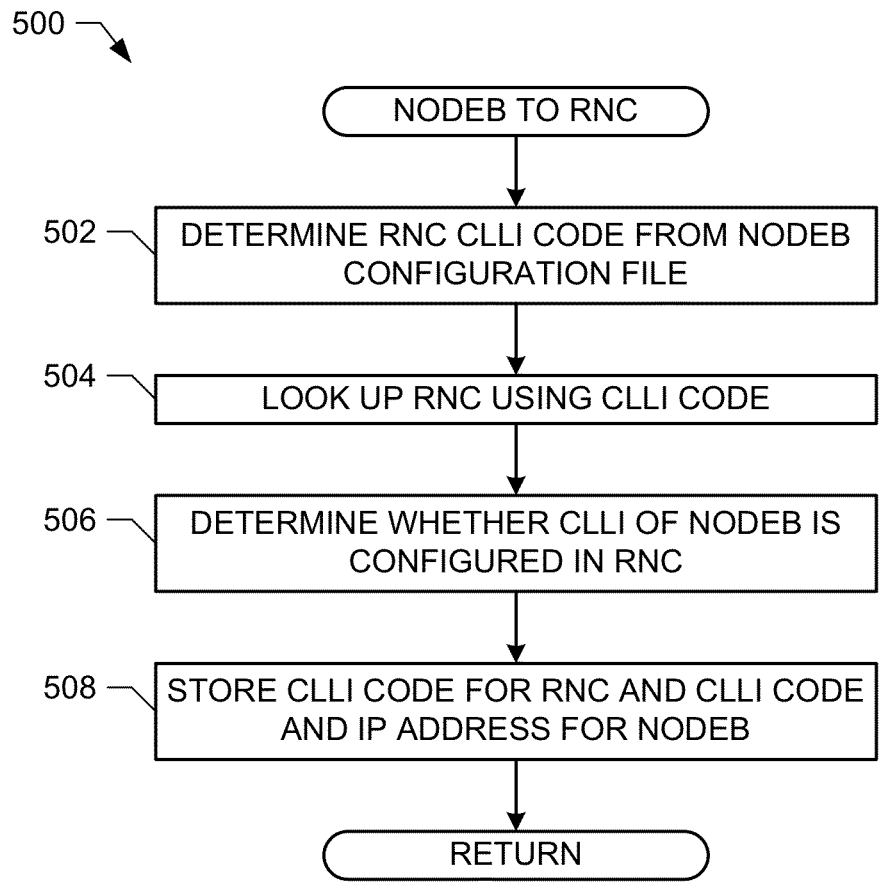
FIG. 5 is a flowchart representative of example machine readable instructions that may be executed to determine an association between a NodeB and a radio network controller.

FIG. 5 is a flowchart representative of example machine readable instructions 500 to determine an association between a NodeB (e.g., the NodeB 102 of FIG. 1) and an RNC (e.g., the RNC 104 of FIG. 1). The example instructions 500 may be performed to implement the configuration identifier 122 and/or to perform block 304 of FIG. 3.

The example configuration identifier 122 of FIG. 1 determines an RNC location identifier, such as a CLLI code, from a configuration file of the NodeB 102 (block 502). For example, the configuration identifier 122 may identify a portion of the configuration file of the NodeB 102 similar to the following:

```
RBS nodeBFunctionIubLink inventory inventory
SubNetwork=ONRM_ROOT_MO_R
SubNetwork=ELSSTXAECR0R03
MeContext=ELSSTXAECR0R03 ManagedElement=1
RncFunction=1 IubLink=Iub_DXU4016
```

In the above example portion of the configuration file, the configuration identifier 122 determines that "ELSSTXAECR0R03" is the CLLI code of the RNC 104. The example configuration identifier 122 also determines the CLLI code of the NodeB 102 as DXU4016. The configuration identifier 122 looks up the RNC 104 based on the determined CLLI code (block 504) and determines whether the CLLI of the NodeB 102 is configured in the RNC 104 (block 506). For example, the configuration identifier 122 may determine whether the CLLI of the NodeB 102 is configured in the configuration file of the RNC 104. The example configuration identifier 122 stores the CLLI code of the RNC 104 and the CLLI code and the IP address of the NodeB 102 (block 508). The stored information may be used to determine the intermediate pathway(s) and/or node(s) between the NodeB 102 and the RNC 104. The example instructions 500 may then end and return control to block 306 of FIG. 3.

Figure 6:
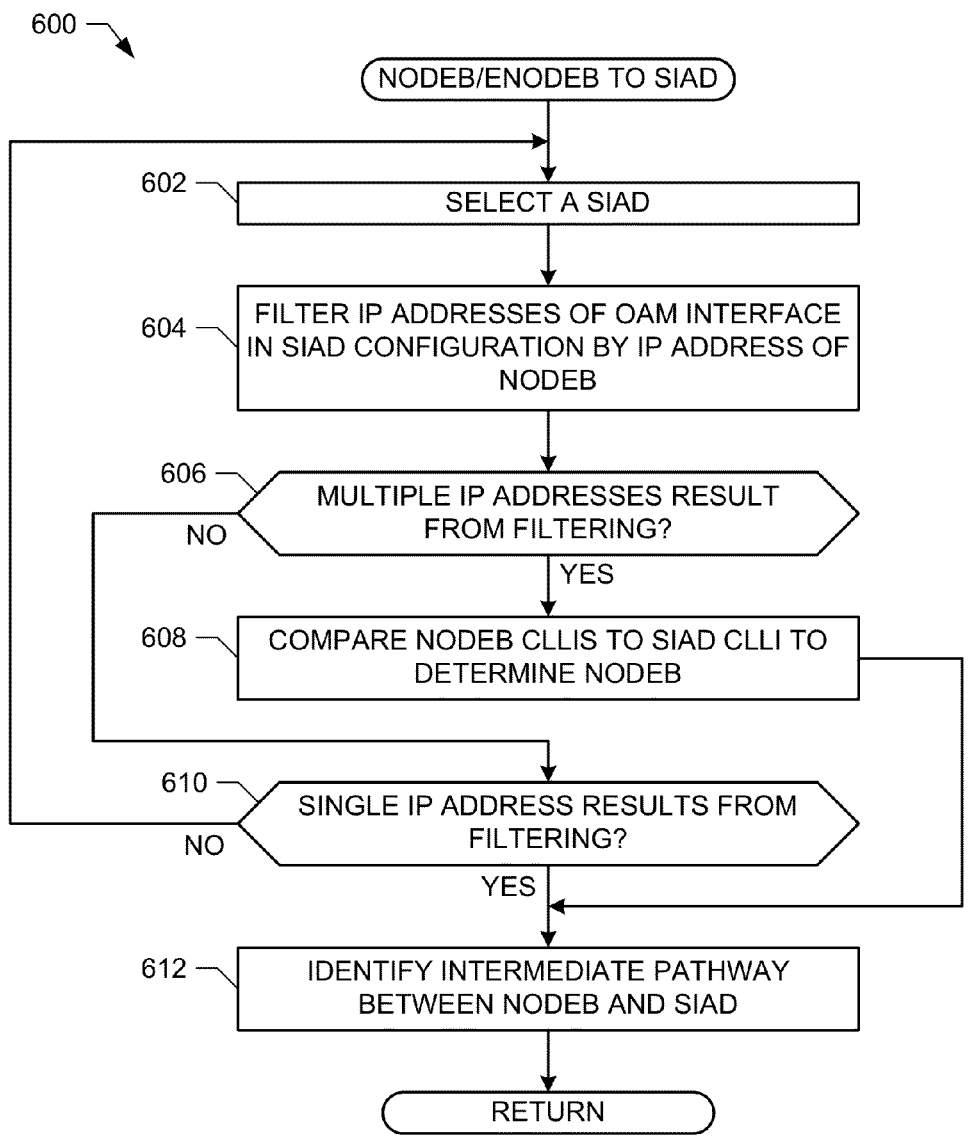
FIG. 6 is a flowchart representative of example machine readable instructions that may be executed to determine a pathway between a NodeB or an eNodeB and an integrated access device.

FIG. 6 is a flowchart representative of example machine readable instructions 600 to determine a pathway between a NodeB or an eNodeB (e.g., the NodeB 102 of FIG. 1, the eNodeB 202 of FIG. 2, etc.) and an integrated access device (e.g., the SIAD 104 of FIGS. 1 and/or 2). The example instructions 600 of FIG. 6 may be performed to implement the configuration identifier 122 of FIGS. 1 and/or 2 to perform blocks 306 and/or 404 of FIGS. 3 and/or 4.

The example configuration identifier 122 selects a SIAD (e.g., the SIAD 106 of FIGS. 1 and/or 2) (block 602). The SIAD 106 may be selected based on a location of the NodeB 102 or eNodeB 202. The example configuration identifier 122 filters IP addresses of an OAM interface in the configuration file of the SIAD 106 by the IP address of the NodeB 102 (or eNodeB 202) (block 604). The OAM IP address is a unique IP address assigned to the NodeB 102 or eNodeB 202 for the purposes of operations, administration, and/or management of the NodeB 102 or eNodeB 202, and may be determined from the configuration file of the NodeB 102 or eNodeB 202. For example, the configuration identifier 122 may identify a portion of the configuration file of the SIAD 106 similar to the following:

```
interface Vlan102
   description Link to E// NodeB- OAM
   ip address 184.135.43.9 255.255.255.248
```

The configuration identifier 122 of FIGS. 1 and/or 2 also identifies the IP address of the OAM interface by identifying a statement such as "Ip nodeIpAddress 1:01 IpOam:Ip 184.135.43.10" from the configuration file of the NodeB 102 (or eNodeB 202). As mentioned above, IP addresses may be re-used between different markets. If multiple IP addresses are identified from the filtering (block 606), the example configuration identifier 122 compares the CLLI code of the NodeB 102 (or eNodeB 202) to the CLLI code of the SIAD 106 (block 608). The closest match may be determined as the CLLI code having the highest number of most significant figures matching the CLLI code of the NodeB 102 (or eNodeB 202). In other words, the closest match may be determined by comparing the characters of the CLLI code starting from the leftmost character and working to the rightmost character, and determining the closest matching code to be the code matching for the longest string of characters from the left. In the example of FIG. 6, the CLLI code ELSSTXAE04W is closer than either of CLLI codes ATLAGAAE78E or ELSSTXRQ48S to the CLLI code ELSSTXAE78E.

The configuration identifier 122 of FIGS. 1 and/or 2 queries the configuration database 124 or another database to identify the CLLI codes of SIADs that closely match the CLLI code of the NodeB 102 (or eNodeB 202). In some examples, multiple queries are performed by progressively replacing a next least significant figure from the CLLI code (relative to the previous query) and determining a number of matching CLLI codes in the database 124 until one or more results are returned. In some examples, the NodeB 102 (or eNodeB 202) having the closest CLLI match to the CLLI of the SIAD 106 is the correct NodeB or eNodeB connected to the SIAD 106.

If there are not multiple IP addresses resulting from the filtering (block 606), the example configuration identifier 122 of FIGS. 1 and/or 2 determines whether a single NodeB (or eNodeB) has resulted from the filter (block 610). If no NodeBs resulted from the filtering (block 610), control returns to block 602 to select another SIAD. If a single IP address has resulted from filtering (block 610), or after determining the NodeB by comparing the CLLI codes (block 608), the example configuration identifier 122 identifies the intermediate pathway between the NodeB 102 (or eNodeB 202) and the SIAD 106 (block 612). Control then returns to block 308 or block 406 of FIG. 3 or 4.

Figure 7:
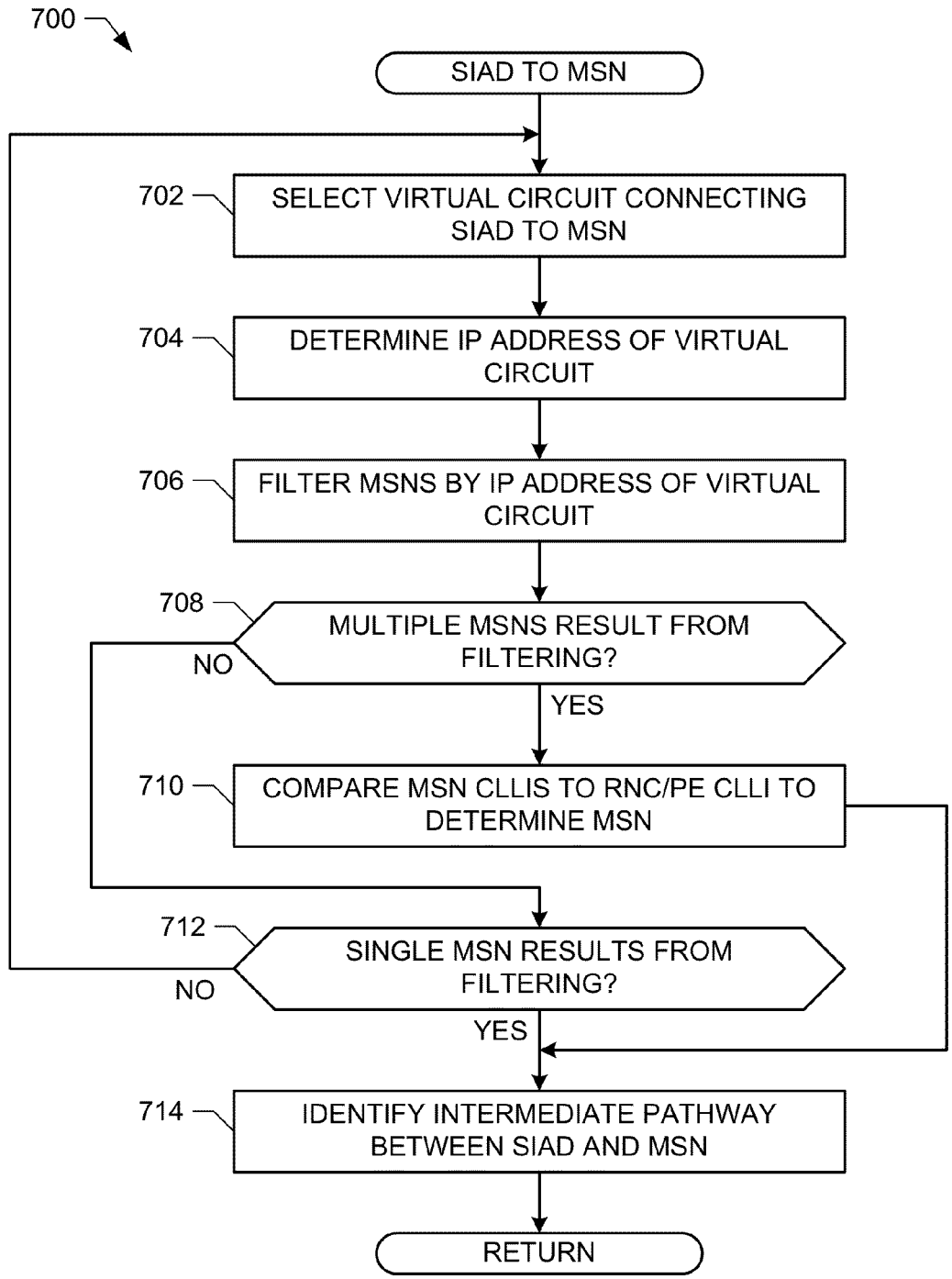
FIG. 7 is a flowchart representative of example machine readable instructions that may be executed to determine a pathway between an integrated access device and a mobile service node.

FIG. 7 is a flowchart representative of example machine readable instructions 700 to determine a pathway between an integrated access device (e.g., the SIAD 106 of FIGS. 1 and/or 2) and an MSN (e.g., the MSN 118 of FIGS. 1 and/or 2). The example instructions 700 of FIG. 7 may be performed to implement the configuration identifier 122 of FIGS. 1 and/or 2 and/or to perform blocks 308 and/or 406 of FIGS. 3 and/or 4.

The example SIAD 106 of FIGS. 1 and/or 2 may be configured to be communicatively coupled to the RNC 104 or the PE 204 via two or more MSNs (e.g., the MSN 118). The pathway through one of the MSNs 118 is configured as the primary pathway for the SIAD 106, and other pathways through other MSNs 118 are considered to be backup or secondary pathways. The SIAD 106 is coupled to the MSNs 118 via respective virtual network connections (e.g., Ethernet virtual circuits (EVCs)), which are configured in the configuration files of SIAD 106 and the MSNs 118. Each EVC is assigned a /30 IP subnet (e.g., the least significant two bits of the IP address are used for the EVC subnet).

The example configuration identifier 122 of FIG. 1 and/or 2 selects a virtual circuit (e.g., an Ethernet virtual circuit (EVC)) connecting the SIAD 106 to the MSN 118 (block 702). The configuration identifier 122 determines the IP address of the virtual circuit (block 704). For example, the configuration identifier 122 may identify the IP address of the EVC by analyzing a portion of the configuration file of the SIAD 106 similar to the following:

```
interface Vlan2011
description Backhaul VLAN to MSN
ip address 32.180.65.134 255.255.255.252
```

In the configuration information above, the example virtual circuit IP address/subnet is 32.180.65.134/30. The configuration identifier 122 filters possible MSNs 118 by the IP address of the EVC (block 706). For example, the configuration identifier 122 identifies the MSNs having an EVC on the same IP subnet as the SIAD 106 by analyzing the configuration files of the MSNs. For example, the configuration identifier 122 may identify a portion of the configuration files of the MSNs similar to the following:

```
interface TenGigabitEthernet2/2.2011
description Primary GE0/0
encapsulation dot1Q 2011
ip address 32.180.65.133 255.255.255.252
```

In the configuration information above, the example virtual circuit IP address/subnet is 32.180.65.134/30, and would therefore be returned by the filtering for consideration as a possible MSN. If multiple MSNs result from the filtering (block 708), the example configuration identifier 122 compares the CLLI codes of the returned MSNs to the CLLI code of the RNC 104 (or the PE) serving the NodeB 102 (or eNodeB 202) (block 710). For example, the configuration identifier 122 may determine the MSN 118 (e.g., from the configuration files) having the CLLI code that most closely matches the CLLI code of the RNC 104 (or the PE 204). If a single MSN results from the filtering (block 712) or after determining the MSN 118 by comparing CLLI codes (block 710), the example configuration identifier 122 identifies the intermediate pathway between the SIAD 106 and the identified (e.g., matching) MSN 118 (block 714). If no MSNs result from the filtering (blocks 708 and 712), control returns to block 702 to select another virtual circuit configured in the SIAD 106.

When the intermediate pathway has been identified (block 714), the example instructions 700 end and control returns to block 310 or block 408 of FIGS. 3 and/or 4.

Figure 8:
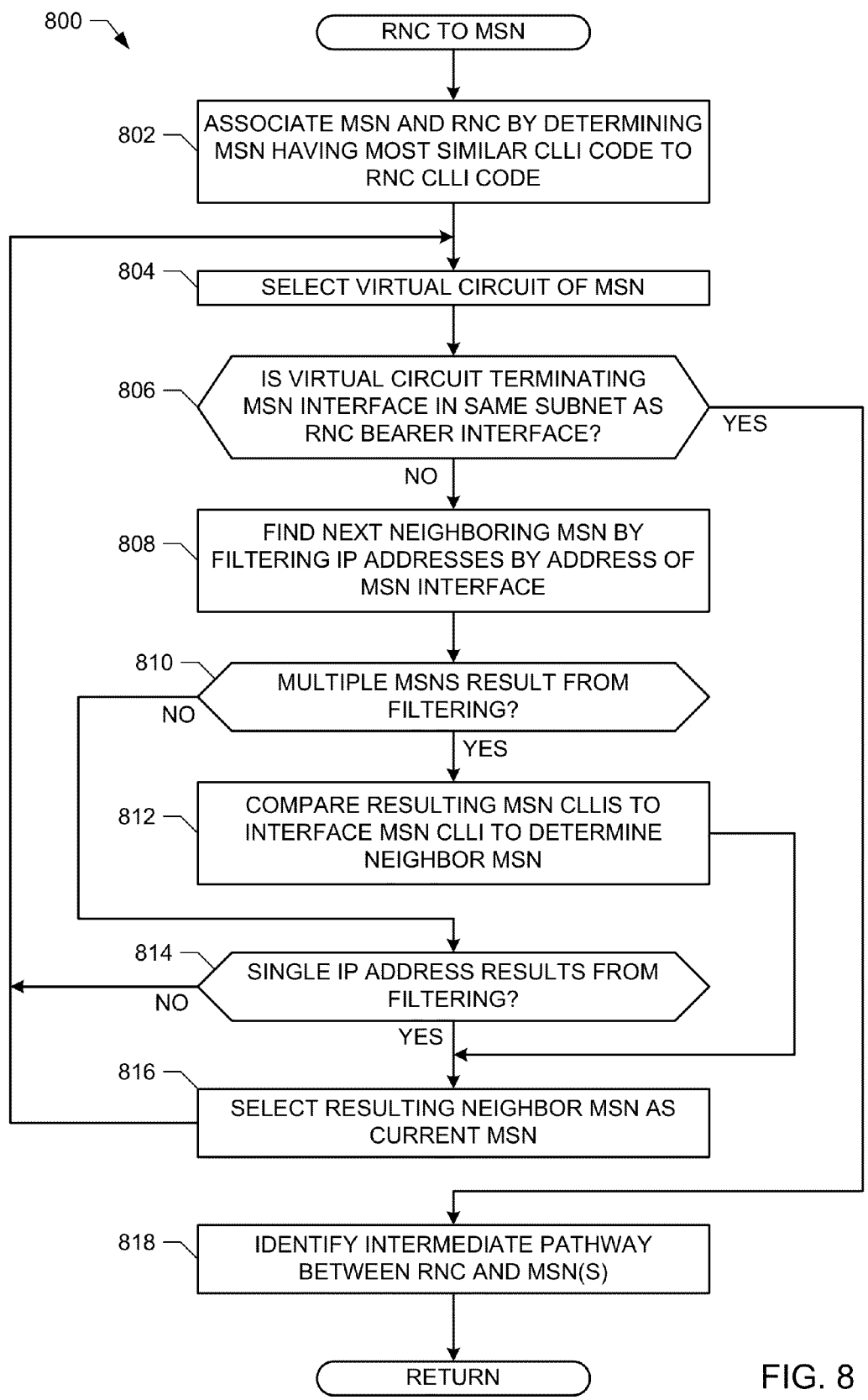
FIG. 8 is a flowchart representative of example machine readable instructions that may be executed to determine a pathway between a radio network controller and a mobile service node.

FIG. 8 is a flowchart representative of example machine readable instructions 800 to determine a pathway between an RNC (e.g., the RNC 104 of FIG. 1) and an MSN (e.g., the MSN 118 of FIG. 1). The example instructions 800 of FIG. 8 may be performed to implement the configuration identifier 122 of FIG. 1 to perform block 310 of FIG. 3.

The example configuration determiner 122 of FIG. 1 associates the MSN 118 and the RNC 104 by determining the MSN 118 having the most similar CLLI code to the CLLI code of the RNC 104 (block 802). The MSN 118 and the RNC 104 are already known to the example configuration identifier 122 via blocks 304 and 308, and/or instructions 500 and/or 700 of FIGS. 3, 5, and/or 7. In some examples, block 802 is performed at block 710 of FIG. 7.

In some cases, the MSN 118 identified in block 308 of FIG. 3 is not directly connected to the RNC 104 via a virtual circuit (e.g., there are multiple MSNs and/or virtual circuits). The example configuration identifier 122 selects a virtual circuit of the MSN 118 by analyzing the configuration file of the MSN 118 (block 804). Each of the virtual circuits configured in the MSN 118 has an IP address on a /30 subnet. The example configuration identifier 122 determines whether the selected virtual circuit terminating at the MSN 118 is on the same subnet as a bearer interface of the RNC 104 (block 806). If the selected virtual circuit is not on the same subnet as the bearer interface of the RNC 104 (block 806), the example configuration identifier 122 determines there are cascading MSNs connecting the NodeB 102 to the RNC 104 and finds a next neighboring MSN to the MSN under consideration by filtering IP addresses by the IP address and subnet of the selected MSN interface (block 808).

If multiple MSNs result from the IP address filtering (block 810), the example configuration identifier 122 compares the resulting CLLI codes of the resulting MSNs to the CLLI code of the MSN of the selected virtual circuit to determine the neighbor MSN (block 812). For example, the configuration identifier 122 may determine the neighboring MSN to be the MSN having the most similar CLLI code to the MSN under consideration.

After determining the neighbor MSN based on comparing CLLI codes (block 812), or if a single MSN is found from the filtering (block 814), the example configuration identifier 122 selects the resulting neighbor MSN as the current MSN under consideration (block 816). After selecting a next MSN for consideration (block 816), or if no MSNs result from filtering (block 814), control returns to block 804 to select another virtual circuit of the MSN under consideration.

When a virtual circuit terminating at the MSN under consideration (e.g., the MSN 118 or another MSN cascading with the MSN 118) also terminates at the RNC 104 (block 806), the example configuration identifier 122 identifies an intermediate pathway between the RNC 104 and the MSN(s) (block 818). The example instructions 800 then end and control returns to block 312 of FIG. 3.

Figure 9:
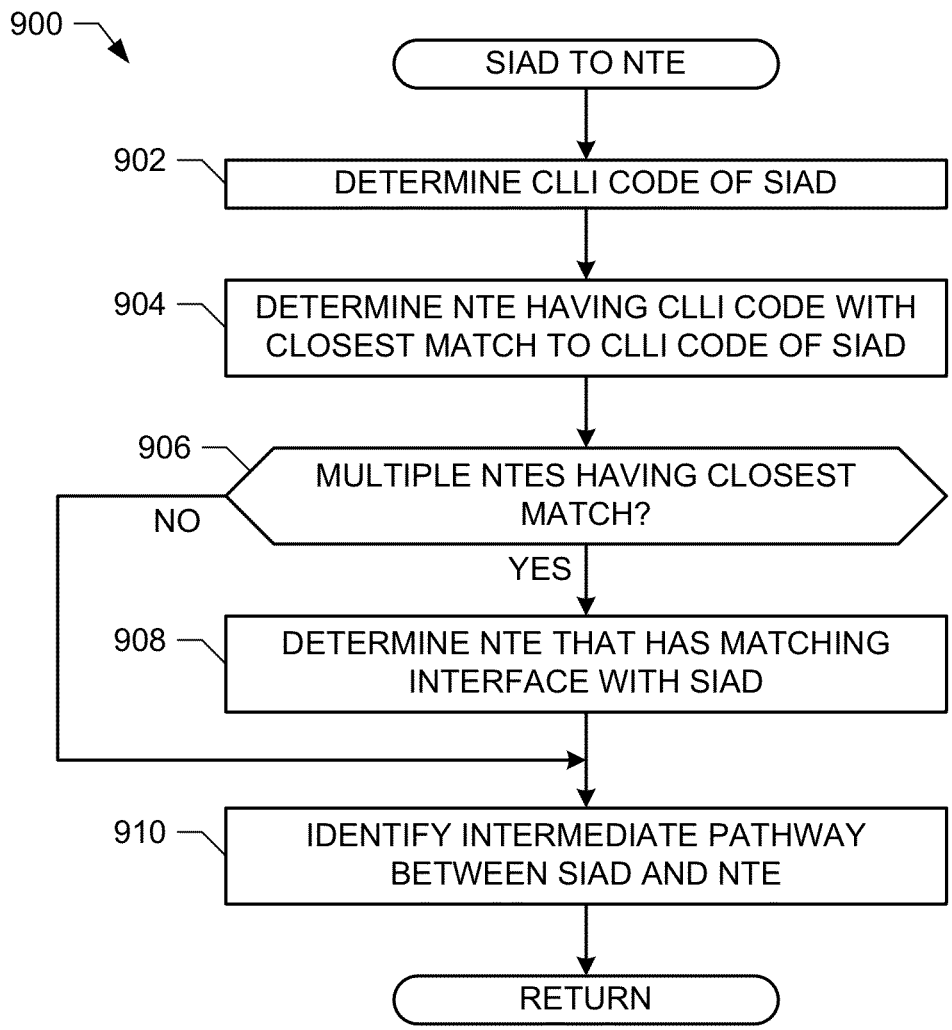
FIG. 9 is a flowchart representative of example machine readable instructions that may be executed to determine a pathway between an integrated access device and network termination equipment.

FIG. 9 is a flowchart representative of example machine readable instructions 900 which may be executed to determine a pathway between an integrated access device (e.g., the SIAD 106 of FIGS. 1 and/or 2) and network termination equipment (e.g., the NTE-A 108 of FIGS. 1 and/or 2). The example instructions 900 of FIG. 9 may be performed to implement the configuration identifier 122 of FIG. 1 to perform block 312 and/or block 410 of FIGS. 3 and/or 4.

The example configuration identifier 122 of FIG. 1 determines a CLLI code of the SIAD 106 (block 902). Block 902 may be performed at block 306 of FIG. 3 and/or block 608 of FIG. 6, in which case the configuration identifier 122 uses (e.g., accesses) the CLLI code determined when performing blocks 306 and/or 608. The example configuration identifier 122 determines an NTE having a CLLI code that is the closest match to the CLLI code of the SIAD 106 (block 904). The closest match may be determined in a similar manner to the method described above with reference to block 608 of FIG. 6.

The configuration identifier 122 of FIGS. 1 and/or 2 determines whether multiple NTEs have a CLLI code having the same closest match with the CLLI code of the SIAD 106 (block 906). If there are multiple NTEs having the same closest match (block 906), the example configuration identifier 122 determines the NTE-A 108 as the associated NTE by determining that the NTE-A 108 has a matching interface with the SIAD 106 (block 908). For example, the configuration identifier 122 may match the interfaces between the SIAD 106 and the NTE-A 108 by analyzing the respective configuration files to determine the interfaces. The example configuration identifier 122 of FIGS. 1 and/or 2 identifies a statement in the configuration file of the NTE-A 108 similar to the following: "NTE Config: virtual-switch ethernet add vs svc-655592 port 9 vlan 1132 encap-cos-policy fixed encap-fixed-dot1dpri 5" and identifies a portion in the configuration file of the SIAD 106 similar to the following:

```
SIAD Config:
    interface Vlan1132
    description Backhaul VLAN to MSN: AUSXTXUJ00W
    ip address 32.180.2.14 255.255.255.252
```

As shown in the example portions of the configuration files, the example configuration identifier 122 matches the VLAN identities in the VLAN statements (e.g., Vlan 1132) that identify the matching interfaces that communicatively couple the SIAD 106 and the NTE-A 108. After identifying the matching interfaces (block 908) or if there is only a single NTE having the closest match (block 906), the example configuration identifier 122 identifies the intermediate pathway between the SIAD 106 and the NTE-A 108 (block 910). The example instructions 900 may then end and return control to block 314 and/or 412 of FIGS. 3 and/or 4.

Figure 10:
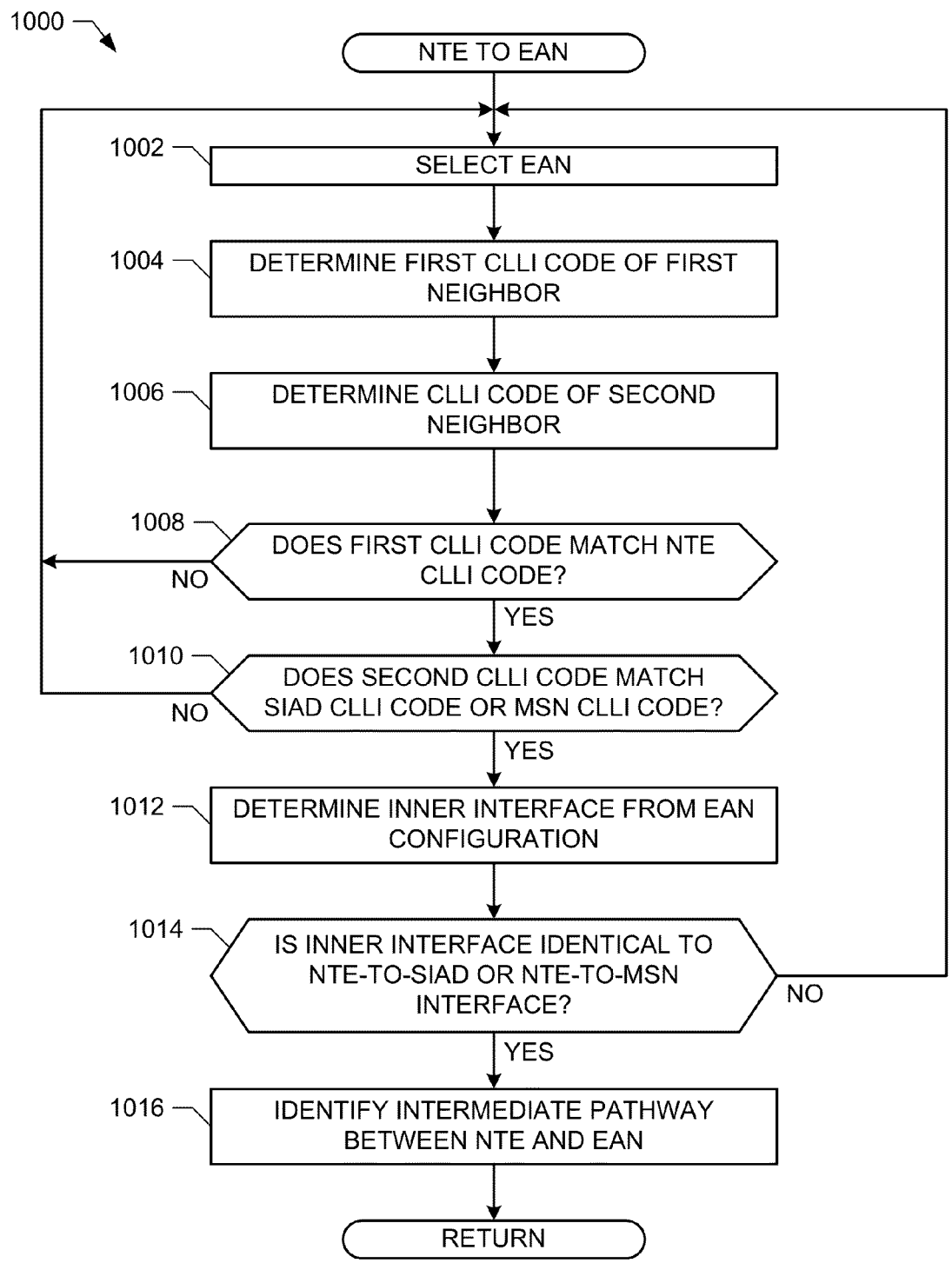
FIG. 10 is a flowchart representative of example machine readable instructions that may be executed to determine a pathway between network termination equipment and an Internet protocol aggregator.

FIG. 10 is a flowchart representative of example machine readable instructions 1000 which may be executed to determine a pathway between an NTE (e.g., the NTE-A 108, the NTE-Z 116 of FIGS. 1 and/or 2) and an EAN (e.g., the EAN-A 110, the EAN-Z 114 of FIGS. 1 and/or 2). The example instructions 1000 of FIG. 10 may be performed to implement the configuration identifier 122 of FIGS. 1 and/or 2 to perform blocks 314, 318, 412, or 416 of FIGS. 3 and/or 4. Associating NTEs with EANs may be problematic because EANs are designed to be agnostic to the NTE.

The example configuration identifier 122 of FIGS. 1 and/or 2 selects an EAN (e.g., the EAN-A 110 of FIGS. 1 and/or 2) (block 1002). The configuration identifier 122 determines a CLLI code of a first neighbor node to the selected EAN-A 110 (e.g., the NTE-A 108 or the NTE-Z 116) (block 1004). The configuration identifier 122 of FIGS. 1 and/or 2 also determines a CLLI code of a neighbor node (e.g., the SIAD 106 or the MSN 118) to the first neighbor node (block 1006). In some examples, the configuration identifier 122 of FIGS. 1 and/or 2 determines the first and second CLLI codes from an interface description field of the configuration file of the EAN-A 110. An example interface description field is provided below:

```
IPAG MX480
ge-3/1/9 {
    description
CME6HM9_P10_JU101/GE1N/AUSTTXHI0FW/BSTRTXDI0AW
```

In the example above, the configuration identifier 122 of FIGS. 1 and/or 2 determines the first CLLI code to be "AUSTTXHI0FW" (block 1004) and determines the second CLLI code to be "BSTRTXDI0AW" (block 1006). The configuration identifier 122 determines whether the first CLLI code matches the CLLI code of the NTE (e.g., the NTE-A 108 or the NTE-Z 116) (block 1008). If the first CLLI code matches the CLLI code of the NTE (block 1008), the configuration identifier 122 also determines whether the second CLLI code matches the CLLI code of the SIAD 106 (e.g., if the NTE is the NTE-A) or the CLLI code of the MSN 118 (if the NTE is the NTE-Z) (block 1010). If a match is not found in either of blocks 1008 or 1010, control returns to block 1002 to select another EAN.

If matches are found in both blocks 1008 and 1010, the example configuration identifier 122 of FIGS. 1 and/or 2 determines an inner interface configured on the EAN (block 1012). An inner interface refers to an interface having communications encapsulated by another interface. For example, the configuration identifier 122 may identify an inner interface portion of the configuration file of the EAN similar to the following:

```
unit 6001 {
    description "MNX | 7107425006AWL | AUSTIN | TX |
        32/KRGN/650193/SW | 0 | 0 | 3946343 |
        USA | OPT-E-MAN |";
    vlan-tags outer 3 inner 1132;
    input-vlan-map {
        swap-swap;
        vlan-id 4094;
        inner-vlan-id 4093;
```

The example configuration identifier 122 of FIGS. 1 and/or 2 also determines the inner interface by identifying a statement such as "virtual-switch ethernet add vs svc-655592 port 9 vlan 1132 encap-cos-policy fixed encap-fixed-dot1dpri 5" in the configuration file of the NTE. The configuration identifier 122 of FIGS. 1 and/or 2 determines whether the inner interface of the configuration of the EAN (e.g., the EAN-A 110 or the EAN-Z 114) is identical to the interface between the NTE-A 108 and the SIAD 106 or the NTE-Z 116 and the EAN-Z 114 (block 1014). In the example above, the configuration identifier 122 compares the "vlan-tags outer 3 inner 1132" statement in the configuration file of the EAN to the "vlan 1132" portion of the statement in the configuration file of the NTE to determine that the inner interfaces match.

If the inner interfaces do not match (block 1014), control returns to block 1002 to select a different EAN. If the inner interfaces match (block 1014), the example configuration identifier 122 identifies an intermediate pathway between the NTE and the selected EAN. The example instructions 1016 then end and control returns to block 316, 320, 414, or 418 of FIGS. 3 and/or 4.

Figure 11:
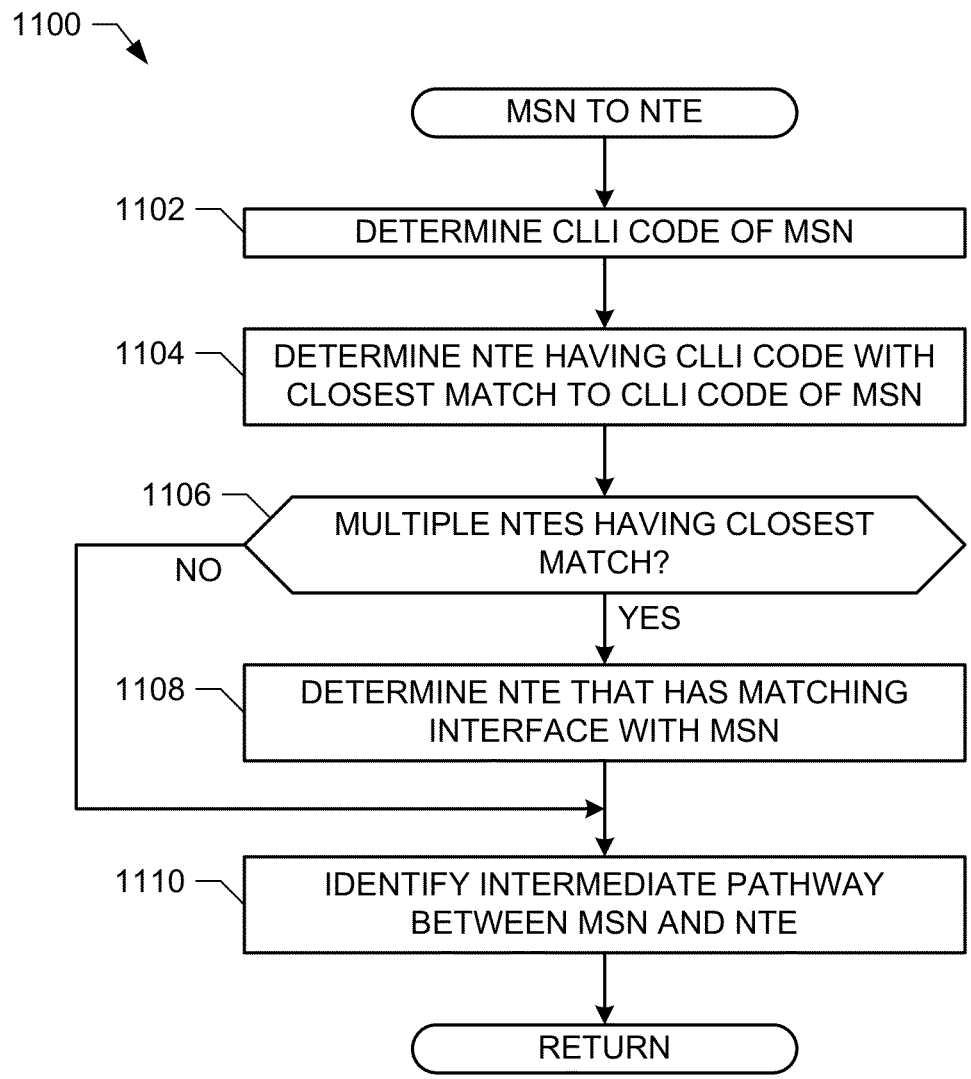
FIG. 11 is a flowchart representative of example machine readable instructions that may be executed to determine a pathway between a mobile service node and network termination equipment.
Figure 12A:
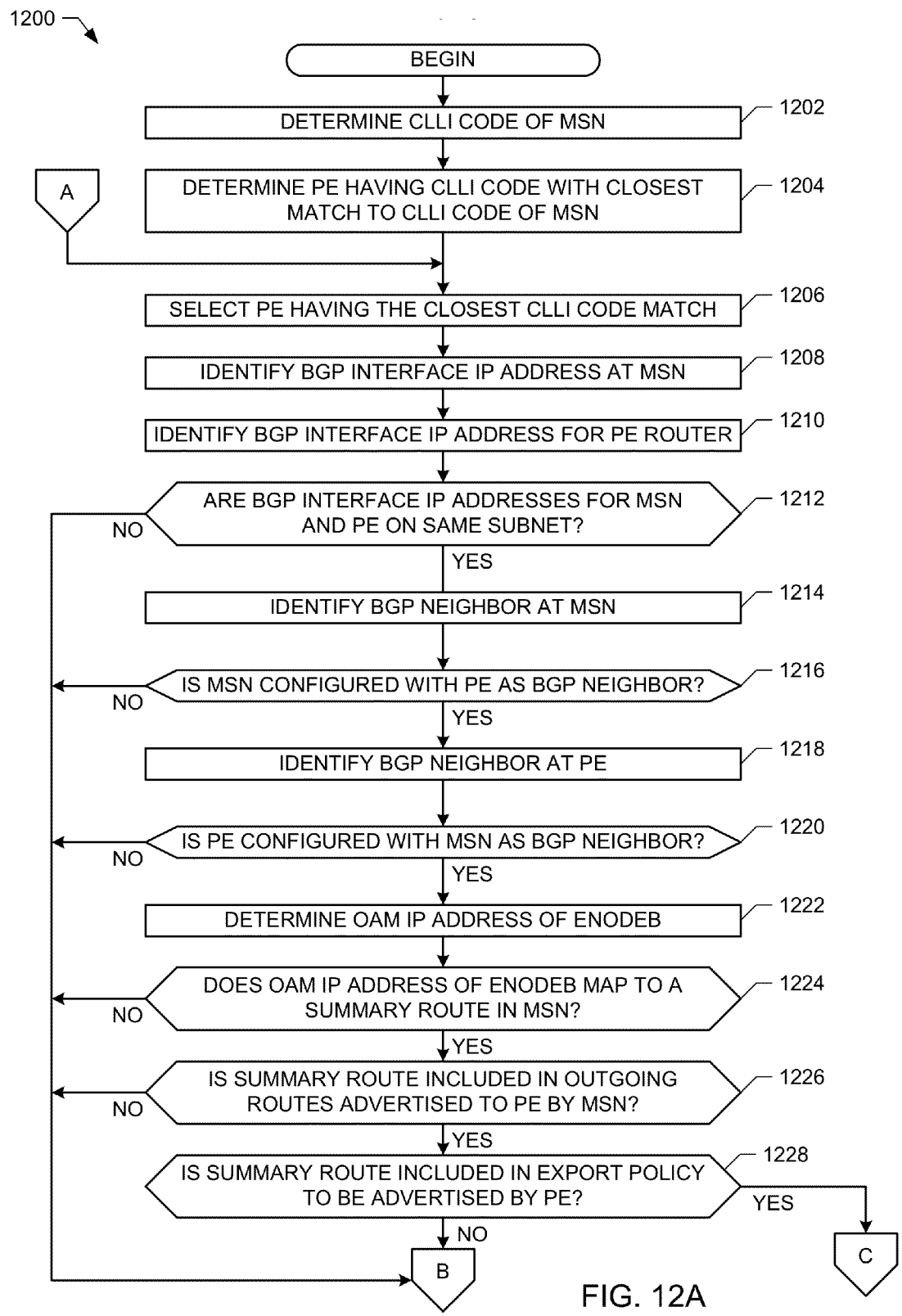
FIGS. 12A and 12B collectively illustrate a flowchart representative of example machine readable instructions that may be executed to determine a pathway between a mobile service node and a provider edge router.
Figure 12B:
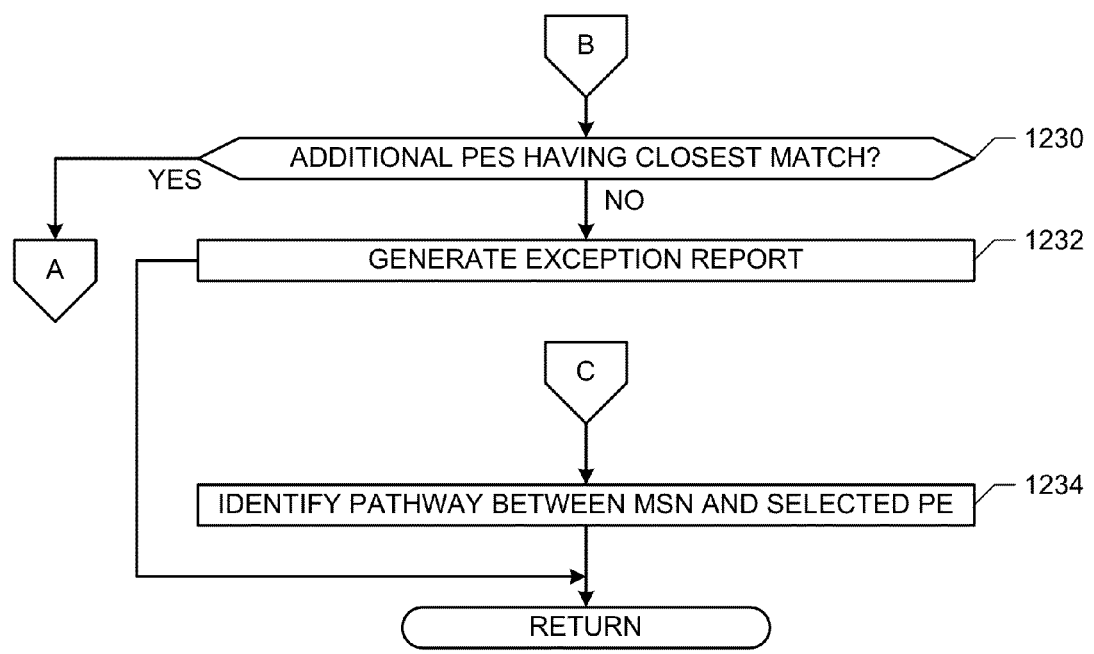

FIG. 11 is a flowchart representative of example machine readable instructions 1100 which may be executed to determine a pathway between an MSN (e.g., the MSN 118 of FIGS. 1 and/or 2) and an NTE (e.g., the NTE-Z 116 of FIGS. 1 and/or 2). The example instructions 1100 of FIG. 11 may be performed to implement the configuration identifier 122 of FIGS. 1 and/or 2 and/or to perform blocks 316 or 414 of FIGS. 3 and/or 4.

The example configuration identifier 122 of FIGS. 1 and/or 2 determines a CLLI code of the MSN 118 (block 1102). For example, the configuration identifier 122 may identify the CLLI code of the MSN 118 from a configuration file of the MSN 118. In some examples, the configuration identifier 122 has knowledge of the CLLI code from performing block 706 of FIG. 7 and/or block 802 of FIG. 8. The configuration identifier 122 of FIGS. 1 and/or 2 determines an NTE having a CLLI code that is a closest match to the CLLI code of the MSN 118 (block 1104). The closest match may be determined as the CLLI code having the highest number of most significant figures matching the CLLI code of the MSN 118.

The configuration identifier 122 of FIGS. 1 and/or 2 determines whether multiple NTEs have a closest matching CLLI code (block 1106). If multiple NTEs have a closest matching CLLI code (block 1106), the example configuration identifier 122 determines an NTE that has a matching interface with the MSN 118 (block 1108). For example, the configuration identifier 122 may identify the interface statements in a configuration file of each matching NTE, and determine whether the interface statements match an interface of the MSN 118. An example set of interface statements that may be analyzed is provided below:

```
virtual-switch ethernet add vs svc-364956 port 28 vlan 1097
virtual-switch ethernet add vs svc-367989 port 28 vlan 1094
virtual-switch ethernet add vs svc-372671 port 28 vlan 1099
virtual-switch ethernet add vs svc-372924 port 28 vlan 1095
```

The configuration identifier 122 of FIGS. 1 and/or 2 searches the configuration file of the NTE for a defined VLAN matching one of the listed VLANs of the configuration file of the MSN 118. When the configuration identifier 122 of FIGS. 1 and/or 2 determines that the MSN 118 has a matching interface with the NTE-Z (block 1108), or if there is only one NTE having a closest match (block 1106), the example configuration identifier 122 of FIGS. 1 and/or 2 identifies the intermediate pathway between the MSN 118 and the NTE-Z 116 (block 1110). The example instructions 1100 then end and control returns to block 318 and/or block 416 of FIGS. 3 and/or 4.

FIG. 12 is a flowchart representative of example machine readable instructions 1200 which may be executed to determine a pathway between an MSN (e.g., the MSN 118 of FIG. 2) and a PE router (e.g., the PE 204 of FIG. 2). The example instructions 1200 of FIG. 12 may be performed to implement the configuration identifier 122 of FIG. 2 to perform block 408 of FIG. 4.

The example configuration identifier 122 of FIG. 2 determines a CLLI code of the MSN 118 (block 1202). For example, the configuration identifier 122 may determine the CLLI code from a configuration file of the MSN 118. In some examples, the CLLI code of the MSN 118 is determined in block 710 of FIG. 7, block 812 of FIG. 8, and/or block 1102 of FIG. 11. The configuration identifier 122 of FIG. 2 determines a PE (e.g., the PE 204) having a CLLI code that is a closest match to the CLLI code of the MSN 118 (block 1204). The closest match may be determined as the CLLI code having the highest number of most significant figures matching the CLLI code of the MSN 118.

The example configuration identifier 122 of FIG. 2 selects the PE (e.g., the PE 204) having the closest matching CLLI code to the CLLI code of the MSN 118 (block 1206). When there are multiple PEs having matching CLLI codes (block 1204), the example configuration identifier 122 of FIG. 2 may select one of the multiple PEs. The configuration identifier 122 of FIG. 2 determines a border gateway protocol (BGP) interface IP address configured in the MSN 118 (block 1208). BGP is a protocol for exchanging routing information between gateway hosts (each with its own router) in a network of autonomous systems. For example, the BGP interface IP address may be identified from a portion of the configuration file of the MSN 118 similar to the following:

```
interface Port-channel2.11
    description LACP Link between MSN-1 and PE-1
    encapsulation dot1Q 11
    ip address 184.143.224.38 255.255.255.252
```

The example configuration identifier 122 of FIG. 2 also determines a BGP interface IP address for the PE 204 (block 1210). For example, the BGP interface IP address may be identified from a portion of the configuration file of the PE 204 similar to the following:

```
unit 10 {
    description " CRTNTX35PERM01|ae4.0|MSN CRTNTX3500W-
    pe1 | GN | 10G |";
    vlan-id 11;
    family inet {
        filter {
            input PE_CE_INGRESS_COS_v4;
            output PE_CE_EGRESS_COS_v4;
        }
        address 184.143.224.37/30;
```

The example configuration identifier 122 of FIG. 2 determines whether the IP addresses of the respective BGP interfaces of the MSN 118 and the PE 204 are on the same subnet (block 1212). In example of FIG. 2, the configuration identifier 122 of FIG. 2 determines that the IP addresses are on the same subnet (e.g., 184.143.224.37/30 for the PE 204 and 184.143.224.38/30 for the MSN 118). If the IP addresses of the respective BGP interfaces are on the same subnet (block 1212), the configuration identifier 122 identifies a BGP neighbor of the MSN 118 (block 1214). For example, the configuration identifier 122 may identify a portion of the configuration file of the MSN 118 similar to the following:

```
router bgp 64600
    bgp router-id 32.183.191.1
    no bgp default ipv4-unicast
    bgp log-neighbor-changes
    neighbor 184.143.224.37 remote-as 20057
```

The "neighbor 184.143.224.37 remote-as 20057" statement indicates that the example MSN 118 is configured with the PE 204 as a BGP neighbor. If the MSN 118 is configured with the PE 204 as a BGP neighbor (block 1216), the example configuration identifier 122 of FIG. 2 identifies a BGP neighbor of the PE 204 (block 1218). For example, the configuration identifier 122 of FIG. 2 may identify a portion of the configuration file of the PE 204 similar to the following:

```
protocols {
    bgp {
        group MSN {
            type external;
            hold-time 180;
            import GN-MSN-BGP-IMPORT;
            export GN-MSN-BGP-EXPORT;
            remove-private;
            peer-as 64600;
            neighbor 184.143.224.38;
            neighbor 184.143.227.230;
        }
```

The "neighbor 184.143.224.38" statement indicates that the example PE 204 is configured with the MSN 118 as a BGP neighbor. If the PE 204 is configured with the PE 204 as a BGP neighbor (block 1220), the configuration identifier 122 determines an OAM IP address of the eNodeB 202 (block 1222). In the example of FIG. 2, the OAM IP address of the eNodeB 202 is 184.139.24.168.

The example configuration identifier 122 of FIG. 2 determines whether the OAM IP address of the eNodeB 202 maps to a summary route in the MSN 118 (block 1224). For example, the configuration identifier 122 may identify the summary routes in the configuration file of the MSN 118 and determine whether any of the summary routes include the OAM IP address of the eNodeB 202. An example summary route analyzed by the example configuration identifier 122 is "ip route 184.139.24.0 255.255.254.0 Null0 name SummaryRoutesToPE," which includes the example OAM IP address of the eNodeB 202 (e.g., 184.139.24.168).

If the OAM IP address of the eNodeB 202 maps to a summary route of the MSN 118 (block 1224), the example configuration identifier 122 of FIG. 2 determines whether the summary route of the MSN 118 (e.g., the summary route including the OAM IP address of the eNodeB 202) is advertised to the PE 204 by the MSN 118 (block 1226). For example, the configuration identifier 122 may identify a portion of the configuration file of the MSN 118 similar to the following:

```
route-map ROUTE_OUTGOING permit 10
    match ip address prefix-list GROUP-A
    set community 13979:2784
!
ip prefix-list GROUP-A seq 10 permit 184.139.24.0/23
!
```

The example portion shown above configures the MSN 118 to advertise the summary route that includes the OAM IP address of the eNodeB 202 (e.g., the summary route 184.139.24.0/23) to the PE 204. If the summary route is advertised by the MSN 118 to the PE 204 (block 1226), the example configuration identifier 122 of FIG. 2 determines whether the summary route advertised by the MSN 118 to the PE 204 is included in an EXPORT policy to be advertised by the PE 204 (e.g., to a provider network) (block 1228). For example, the configuration identifier 122 may identify a portion of the configuration file of the PE 204 similar to the following:

```
GN {
    instance-type vrf;
    interface ae4.10;
```

-continued

```
    vrf-import GN-IMPORT;
    vrf-export GN-EXPORT;
policy-statement GN-EXPORT {
    term t20 {
        from {
            route-filter 184.139.24.0/23 orlonger;
```

The policy-statement GN-EXPORT in the above example defines the routes advertised on the interface named "GN" and includes the route 184.139.24.0/23, which is the route advertised by the MSN 118 and is the route that includes the OAM IP address of the eNodeB 202. Thus, the configuration identifier 122 may determine for this example that the summary route is included in the EXPORT policy for advertisement by the PE 204. GN is an example name for the policy, and other names may be used.

If the BGP interface IP addresses for the MSN 118 and the PE 204 are not on the same subnet (block 1212), if the MSN 118 is not configured with the PE 204 as a BGP neighbor (block 1216), if the PE 204 is not configured with the MSN 118 as a BGP neighbor (block 1218), if the OAM IP address of the eNodeB 202 does not map to a summary route in the MSN 118 (block 1224), if the summary route is not included in the outgoing routes advertised by the MSN 118 to the PE 204 (block 1226), or if the summary route is not included in the EXPORT policy (block 1228), the example configuration identifier 122 of FIG. 2 determines whether any additional PEs have a closest CLLI match with the MSN 118 (block 1230). If there are additional PEs (block 1230), control returns to block 1204 to select another PE having a closest CLLI code match. If there are no additional PEs (block 1230), the example configuration identifier 122 generates an exception report (block 1232). The exception report may include identifications of the eNodeB 202, the PE 204, the MSN 118, the SIAD 106, an indication of a misconfiguration (e.g., a connectivity issue), and/or any other information that would be useful for a technician or other network operator to diagnose the configuration. In some examples, the configuration identifier 122 generates an exception report whenever any of the instructions 300-1300, 1500, 1600, and/or 1800 and/or blocks fails to identify a respective pathway or element.

If the summary route is included in the EXPORT policy (block 1228), the example configuration identifier 122 identifies a pathway between the MSN 118 and the selected PE 204 (block 1234). After identifying the pathway (block 1234) or generating the exception report (block 1232), the example instructions 1200 end and control returns to block 410 of FIG. 4.

Figure 13:
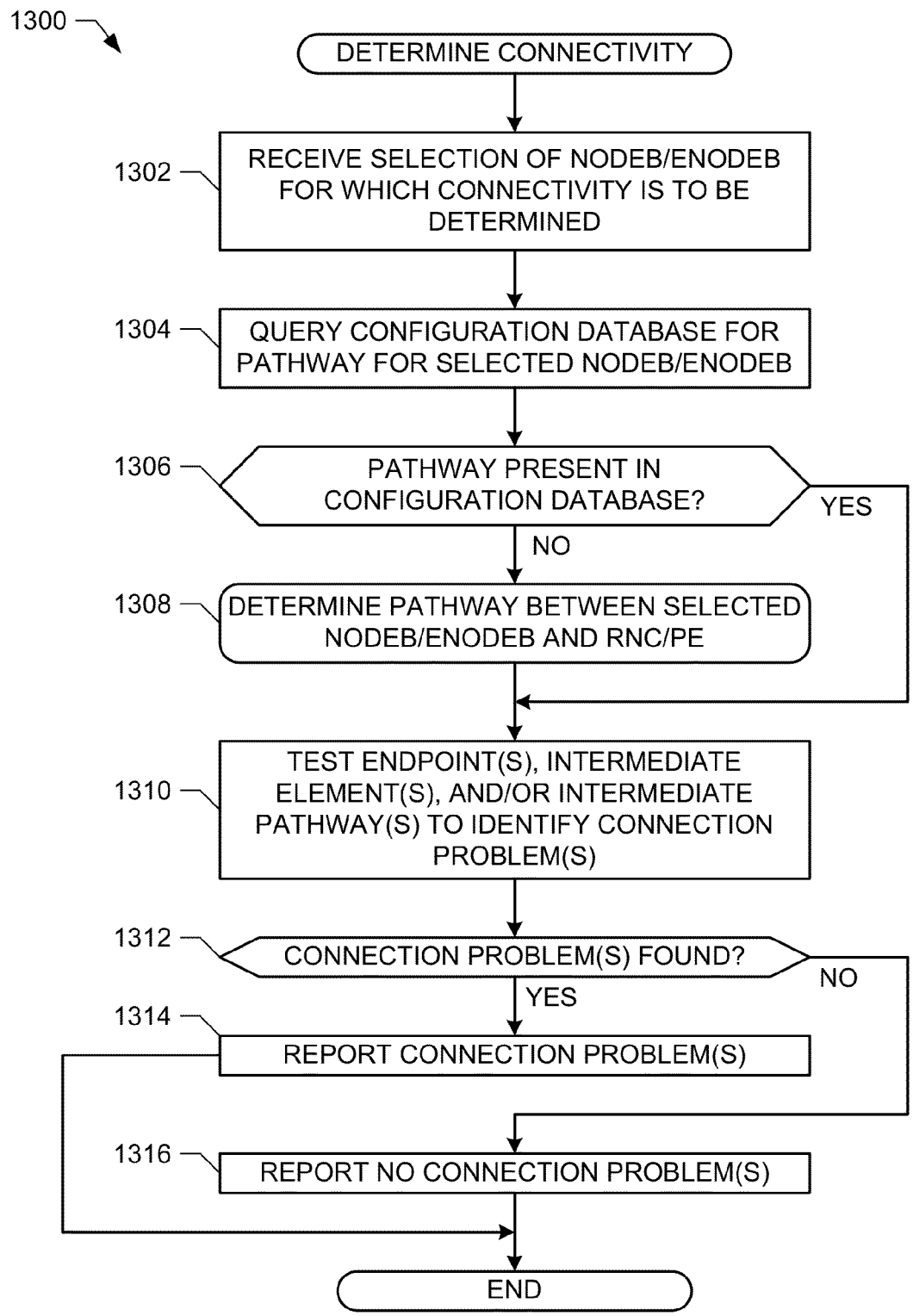
FIG. 13 is a flowchart representative of example machine readable instructions that may be performed to determine connectivity for a NodeB or an eNodeB.

FIG. 13 is a flowchart representative of example machine readable instructions 1300 which may be executed to determine connectivity for a NodeB (e.g., the NodeB 102 of FIG. 1) or an eNodeB (e.g., the eNodeB 202 of FIG. 2). The example instructions 1300 may be performed by the connectivity determiner 126 of FIGS. 1 and/or 2. In some examples, the instructions 1300 are performed in response to a request for the connectivity of a NodeB (e.g., the NodeB 102 of FIG. 1) and/or an eNodeB (e.g., the eNodeB 202 of FIG. 2).

The example connectivity determiner 126 of FIGS. 1 and/or 2 receives a selection of a NodeB or eNodeB for which connectivity is to be determined (block 1302). For example, the connectivity determiner 126 may include a user interface through which requests for connectivity reports may be received. The connectivity determiner 126 of FIGS. 1 and/or 2 queries the configuration database 124 for a pathway for the selected NodeB 102 or eNodeB 202 (block 1204). For example, the query for the pathway may include a query for the intermediate nodes and/or pathways between a NodeB and an RNC (e.g., the pathway between the NodeB 102 and the RNC 104 of FIG. 1), between an eNodeB and a PE (e.g., the pathway between the eNodeB 202 and the PE 204 of FIG. 2), and/or between an eNodeB 202 and an MME 1402, a SGW 1406, a PGW 1408, and/or a neighbor eNodeB 1410.

The connectivity determiner 126 and/or the configuration database 124 determine whether the requested pathway is present in the configuration database 124 (block 1306). If the pathway is not present (block 1306), the example configuration identifier 122 determine a pathway between the selected NodeB 102 or eNodeB 202 and an RNC 104 or PE 204 (block 1308). For example, the connectivity determiner 126 and/or the configuration database 124 may issue a request to identify the configuration of the selected NodeB 102 or eNodeB 202 to the configuration identifier 122. The example configuration identifier 122 may perform block 1308 by performing the instructions 300, 400 of FIGS. 3 and/or 4, and return the resulting pathway (or an exception report) to the connectivity determiner 126.

After determining the pathway (block 1308) or if the pathway is present in the configuration database (block 1306), the example connectivity determiner 126 of FIGS. 1 and/or 2 tests the endpoints (e.g., the NodeB 102 and the RNC 104, the eNodeB 202 and the PE 204, etc.), the intermediate elements (e.g., the SIAD 106, the NTE-A 108, the EAN-A 110, the Ethernet network 112, the EAN-Z 114, the NTE-Z 116, and/or the MSN 118), and/or the intermediate pathway(s) to identify any connection problems for the selected NodeB or eNodeB (block 1310).

The example connectivity determiner 126 of FIGS. 1 and/or 2 determines whether any connection problem(s) are found (block 1312). If any connection problem(s) are found (block 1312), the example connectivity determiner 126 reports the connection problem(s) (block 1314). For example, the connectivity determiner 126 may output a report of the connection problem(s) via a user interface, an electronic communication, and/or any other method of reporting. After reporting the connection problem(s) (block 1314) or reporting that no connection problems are found (block 1316), the example instructions 1300 may end or iterate to determine connectivity for additional NodeBs and/or eNodeBs.

Figure 14:
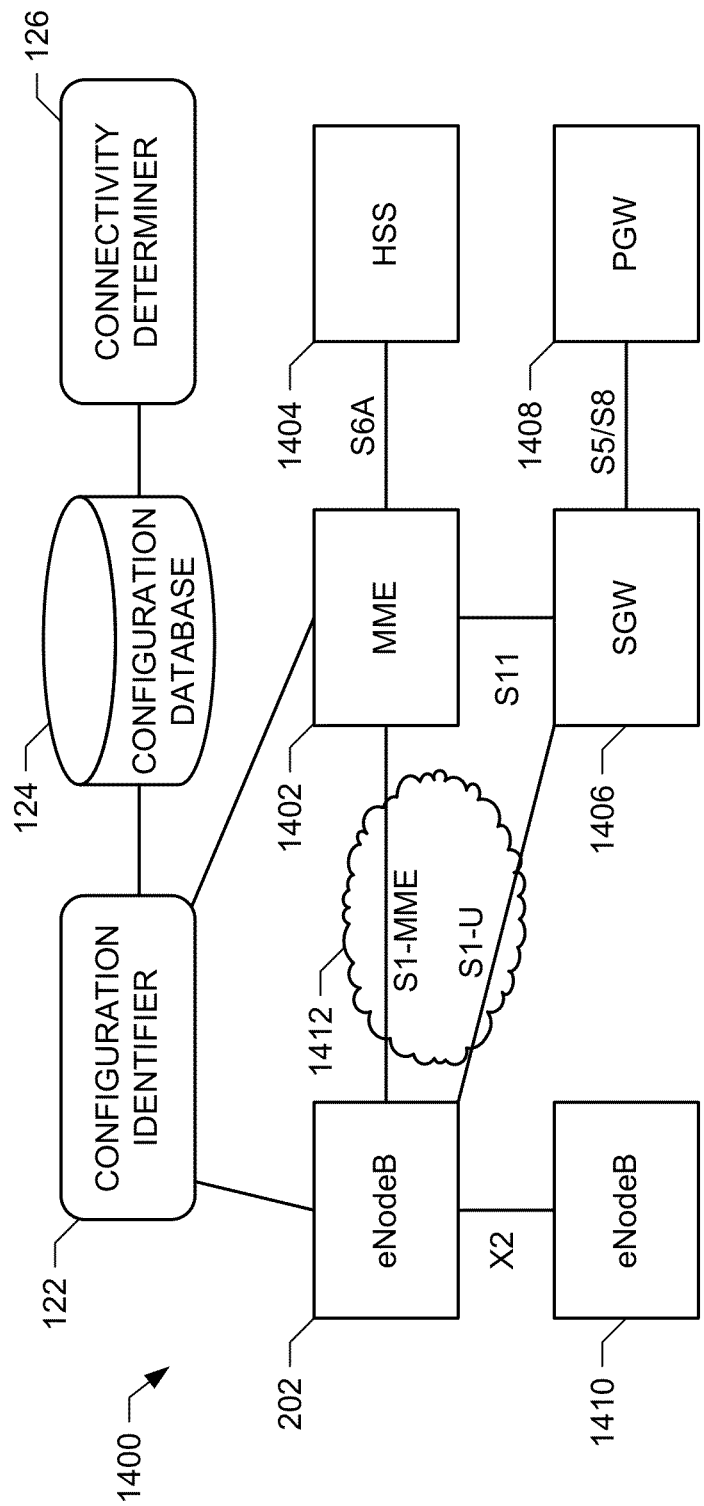
FIG. 14 is a block diagram of another example system constructed in accordance with the teachings of this disclosure to determine extended connectivity for an eNodeB.

FIG. 14 is a block diagram of another example system 1400 constructed in accordance with the teachings of this disclosure to determine connectivity between the eNodeB 202 and network elements including a mobility management entity (MME) 1402, a home subscriber server (HSS) 1404, a serving gateway (SGW) 1406, a packet data network gateway (PGW) 1408, and a neighboring eNodeB 1410. The example eNodeB 202 connects to the network elements 1402-1410 via the network elements 104-118 and/or the PE 204 of FIG. 2, which are collectively illustrated as backbone network 1412. The example configuration identifier 122 may identify the configurations and/or connections between the eNodeB 202 and the network elements 1402-1410.

To determine the connectivity between the eNodeB 202 and the elements 1402-1410, the example configuration identifier 122 of FIG. 14 obtains the configuration file of the eNodeB 202. Using the information in the configuration file for the eNodeB 202, the example configuration identifier 122 determines an identity of the MME 1402 serving the eNodeB 202 (e.g., from a configured IP address and/or name of the MME 1402) and the identity of the neighboring eNodeB 1410 (e.g., from a configured IP address and/or name of the neighboring eNodeB 1410). The example configuration identifier 122 of FIG. 14 obtains configuration information from the MME 1402 to determine an interface from the MME 1402 to the HSS 1404 (e.g., from Diameter peer information).

While an example manner of implementing the system 1400 has been illustrated in FIG. 14, one or more of the elements, processes and/or devices illustrated in FIG. 14 may be combined, divided, re-arranged, omitted, eliminated and/or implemented in any other way. Further, the example configuration identifier 122, the example configuration database 124, the example connectivity determiner 126 and/or, more generally, the example system 1400 of FIG. 14 may be implemented by hardware, software, firmware and/or any combination of hardware, software and/or firmware. Thus, for example, any of the example configuration identifier 122, the example configuration database 124, the example connectivity determiner 126 and/or, more generally, the example system 1400 of FIG. 14 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example configuration identifier 122, the example configuration database 124, and/or the example connectivity determiner 126 are hereby expressly defined to include a tangible computer readable medium such as a memory, DVD, CD, Blu-ray, etc. storing the software and/or firmware. Further still, the example configuration identifier 122, the example configuration database 124, and/or the example connectivity determiner 126 of FIGS. 1 and/or 2 may include one or more elements, processes and/or devices in addition to, or instead of, those illustrated in FIG. 14, and/or may include more than one of any or all of the illustrated elements, processes and devices.

Figure 15:
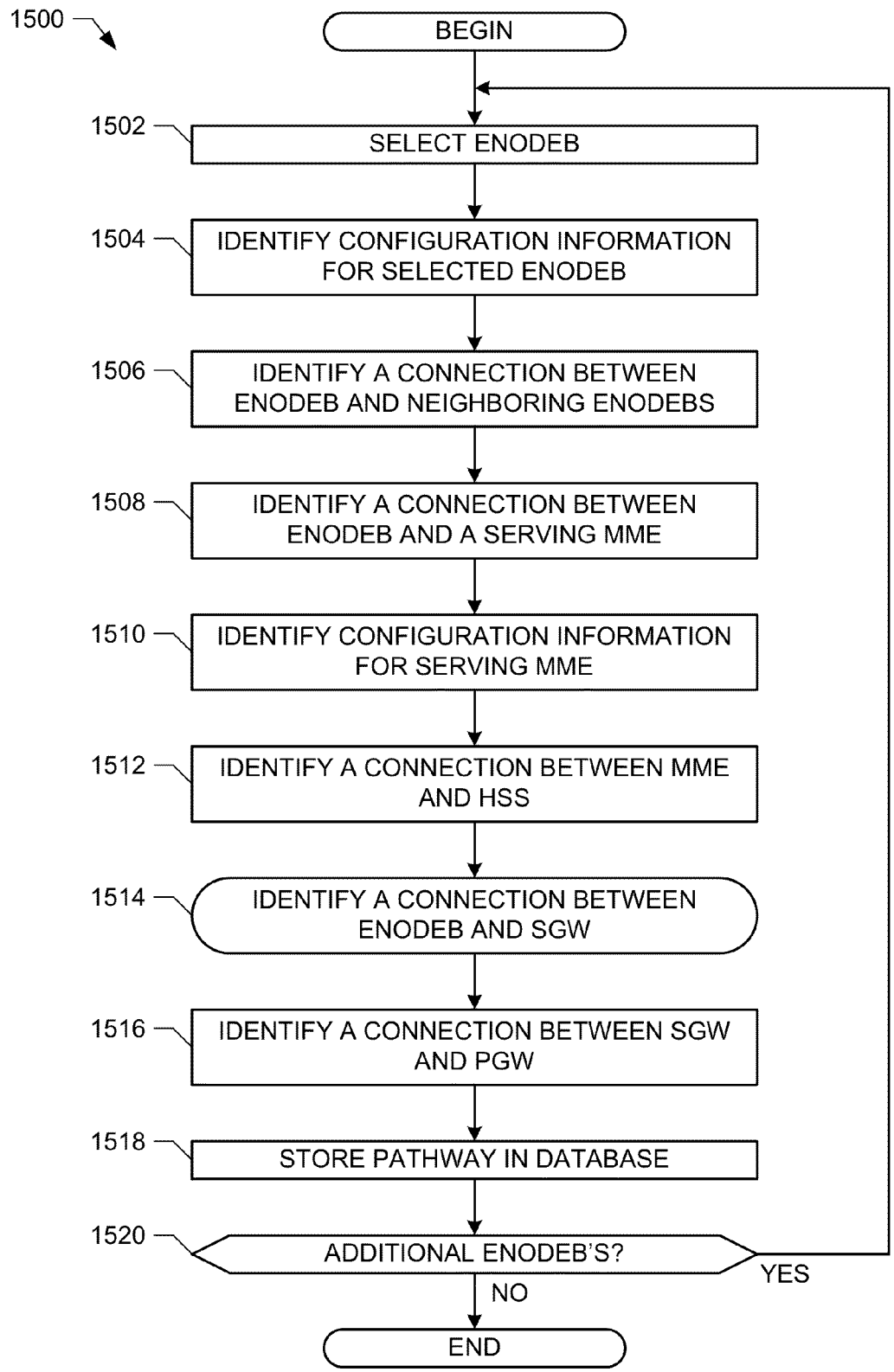
FIG. 15 is a flowchart representative of example machine readable instructions that may be executed to determine extended connectivity for an eNodeB.

The example instructions 1500 and/or 1600 of FIGS. 15 and/or 16 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). Additionally or alternatively, the example processes of FIGS. 15 and/or 16 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

Figure 16:
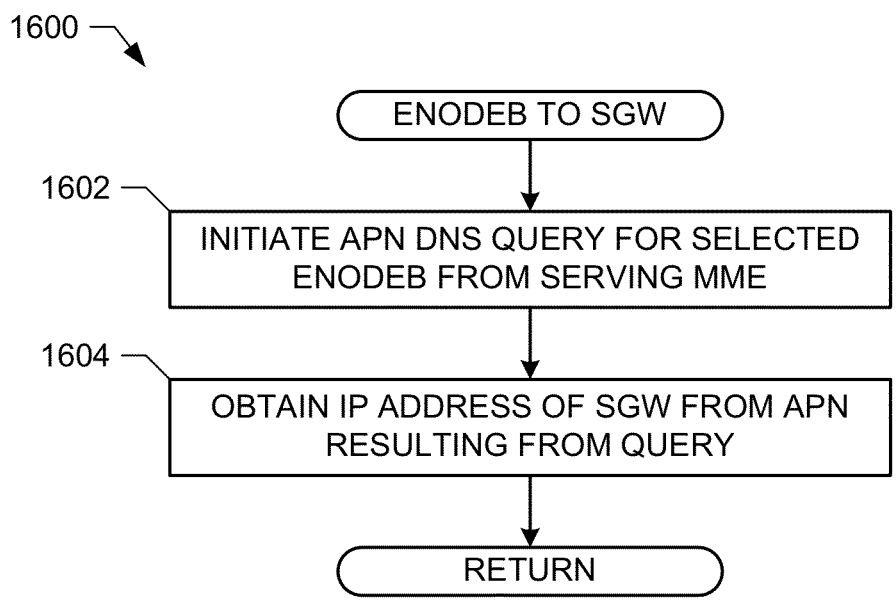
FIG. 16 is a flowchart representative of example machine readable instructions that may be executed to determine a pathway between the eNodeB of FIGS. 4 and 14 and a serving gateway.

Flowcharts representative of example machine readable instructions for implementing the configuration identifier 122, the configuration database 124, and/or the connectivity determiner 126 of FIG. 14 are shown in FIGS. 15 and 16. In this example, the machine readable instructions comprise a program for execution by a processor such as the processor 1912 shown in the example processor platform 1900 discussed below in connection with FIG. 19. The program may be embodied in software stored on a tangible computer readable medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 15 and/or 16, many other methods of implementing the configuration identifier 122, the configuration database 124, and/or the connectivity determiner 126 of FIG. 14 may alternatively be used. For example, the order of execution of the blocks may be changed, and/or some of the blocks described may be changed, eliminated, or combined.

FIG. 15 is a flowchart representative of example machine readable instructions 1500 which may be executed to determine an extended connectivity for an eNodeB (e.g., the eNodeB 202 of FIG. 14). The example instructions 1500 of FIG. 15 may be performed by the example configuration identifier 122 of FIG. 14. In some examples, the instructions 1500 are performed in conjunction with the instructions 400 of FIG. 4 to extend a configuration and/or connectivity mapping for one or more eNodeBs in a network.

The example configuration identifier 122 of FIG. 15 selects an eNodeB (e.g., the eNodeB 202 of FIG. 14) (block 1502). The configuration identifier 122 of FIG. 14 identifies configuration information (e.g., a configuration file) for the selected eNodeB 202 (block 1504). Configuration information for the eNodeB 202 includes information that may be read or derived from the configuration file of the eNodeB 202, such as a site identifier, a site location, a node name, a geographic location (e.g., latitude, longitude, and/or altitude), a time zone, a node IP Address, a cell identifier, a cell sectors, a serving MME names, a serving MME IP address, a served mobile country code (MCC), a served mobile network code (MNC), an Ethernet IP Address, an IP address mask, a broadcast address, a media access control (MAC) address, a maximum transmission unit (MTU), a next hop IP Address, neighboring eNodeB IP addresses, neighboring eNodeB names and/or any other site information, cell information, address information, static route information, and/or interface (e.g., X2 interface) information.

The example configuration identifier 122 of FIG. 14 identifies a connection between the selected eNodeB 202 and neighboring eNodeBs (e.g., the eNodeB 1410 of FIG. 14) (block 1506). For example, the configuration file of the eNodeB 202 may include a name and/or IP address of the neighboring eNodeB 1410 in X2 interface configuration information.

The example configuration identifier 122 of FIG. 14 identifies a connection between the eNodeB 202 and a serving MME (e.g., the MME 1402 of FIG. 14) (block 1508). For example, the configuration identifier 122 may identify a name and/or an IP address of the MME 1402 in the configuration file of the eNodeB 202. The configuration identifier 122 of the illustrated example identifies configuration information for the serving MME 1402 (block 1510). Configuration information for the MME 1402 includes information that may be read or derived from the configuration file of the MME 1402, such as a MME domain name, a domain name server (DNS) identifier, a DNS IP address, IP interface names, IP interface addresses, IP interface address masks, VLAN identifiers, physical port names, physical port addresses, a geographical area name, an MCC, an MNC, a tracking area name, Diameter peer information, and/or any other information that is used to configure the MME 1402.

The example configuration identifier 122 of FIG. 14 identifies a connection between the MME 1402 and the HSS 1404 (block 1512). For example, the configuration identifier 122 may determine the connection based on Diameter peer information extracted from the configuration file of the MME 1402. The example configuration identifier 122 identifies a connection between the eNodeB 202 and the SGW 1406 (block 1514). While connections between the eNodeB 202 and elements such as the MME 1402 and the neighboring eNodeB 1410 are configured as static routes in the system 1400, the connection between the eNodeB 202 and the SGW 1406 (e.g., via an S1-U interface) may be dynamic. An eNodeB 202 may be connected to one of multiple SGWs and/or PGWs based on geographic considerations and/or load balancing. To identify the connection between the eNodeB 202 and the SGW 1406, the example configuration identifier 122 causes the MME 1402 to query an APN DNS server, which provides information that may be used to determine an SGW to which the eNodeB 202 is to be connected. Instructions which may be executed to implement block 1514 are described below with reference to FIG. 16.

The example configuration identifier 122 of FIG. 14 further identifies a connection between the SGW 1406 (e.g., an identified SGW) and the PGW 1408 (block 1516). For example, on identifying the SGW 1406, the example configuration identifier 122 may request an identity of the PGW 1408 from the SGW 1406. The configuration identifier 122 of FIG. 14 stores the determined pathway in the configuration database (block 1518). For example, the configuration identifier 122 may provide the configuration database 124 with the identities (e.g., names, IP addresses, etc.) of the eNodeB 202, the MME 1402, the HSS 1404, the SGW 1406, the PGW 1408, and the neighboring eNodeB 1410, and any intermediate pathways and/or interfaces between the elements 202, 1402-1410. The configuration database 124 stores the pathway information as an end-to-end connection associated with the eNodeB 202.

The configuration identifier 122 of FIG. 14 determines whether there are additional eNodeBs for which a pathway or connectivity is to be determined (block 1520). If there are additional eNodeBs (block 1520), control returns to block 1502 to select another eNodeB. When there are no additional eNodeBs (block 1520), the example instructions 1500 may end.

FIG. 16 is a flowchart representative of example machine readable instructions 1600 which may be executed to determine a pathway between the eNodeB 202 of FIGS. 2 and/or 14 and an SGW (e.g., the SGW 1406 of FIG. 14). The example instructions 1600 may be performed by the configuration identifier 122 and/or the MME 1402 of FIG. 14 to implement block 1514 of FIG. 15.

The example configuration identifier 122 of FIG. 14 initiates an access point name (APN) domain name server (DNS) query for the selected eNodeB 202 via the eNodeB 202 and/or the serving MME 1402 for the eNodeB 202 (block 1602). The MME 1402 may query a DNS server by providing a tracking area code of the eNodeB 202 to the APN DNS which, in the example of FIG. 14, selects the SGW 1406 from a pool of possible SGWs. Based on the tracking code, the DNS performs a lookup to resolve the query to determine an SGW to which the eNodeB 202 is to be assigned. The lookup and/or selection may be based on a geographic location (e.g., the tracking area) and/or current loads on the SGWs in the system 1400. The MME 1402, the eNodeB 202, and/or the configuration identifier 122 obtain the IP address and/or name of the selected SGW 1406 returned from the DNS server (block 1604). The example instructions 1600 may then end. Control then returns to block 1516 of FIG. 15.

Figure 17:
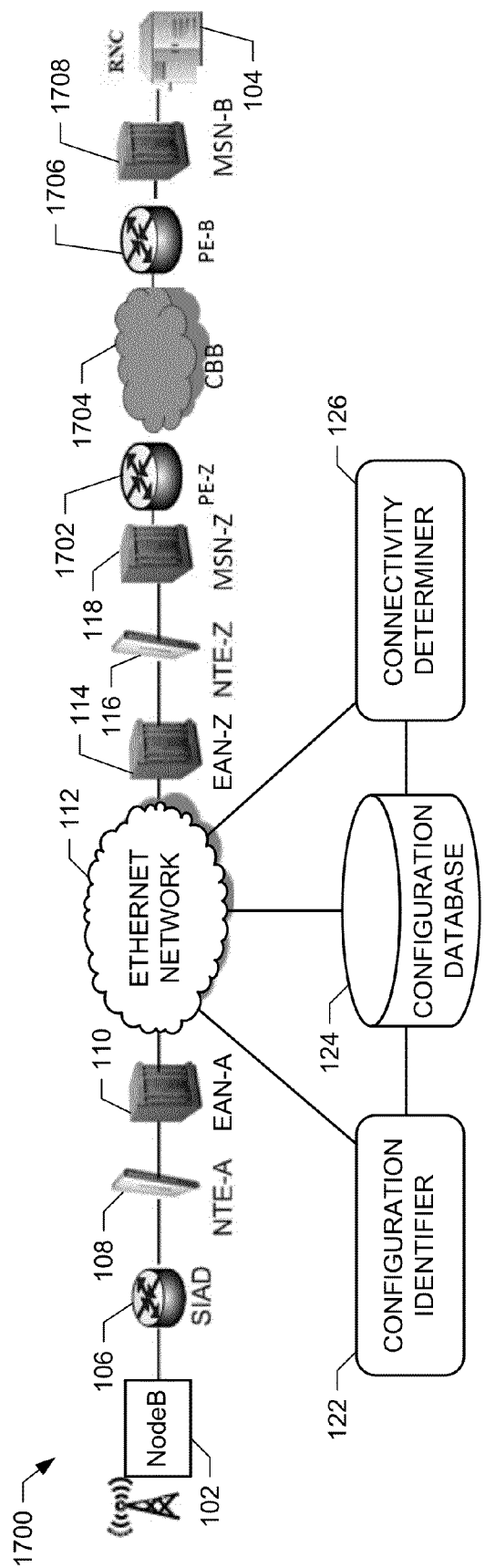
FIG. 17 is a block diagram of another example system constructed in accordance with the teachings of this disclosure to determine connectivity between a NodeB node and a radio network controller.

FIG. 17 is a block diagram of another example system 1700 to determine connectivity between the NodeB 102 and the RNC 104. The example system 1700 of FIG. 17 includes the NodeB 102, the RNC 104, and the elements 106-118 of FIG. 1. In the example of FIG. 17, the RNC 104 serving the NodeB 102 is associated with a different region or area than the NodeB 102. Thus, the example system 1700 of FIG. 17 includes a first PE router 1702, a core backbone network 1704, a second PE router 1706, and a third MSN 1708 (e.g., MSN-B) coupling the NodeB 102 and the RNC 104. The example system 1700 of FIG. 17 also includes an example configuration identifier 122, an example configuration database 124, and an example connectivity determiner 126. In the example of FIG. 17, the configuration identifier 122 determines the configuration and/or an end-to-end connection between the NodeB 102 and the RNC 104 via the network elements 106-118 and 1702-1710.

While an example manner of implementing the system 1700 has been illustrated in FIG. 17, one or more of the elements, processes and/or devices illustrated in FIG. 17 may be combined, divided, re-arranged, omitted, eliminated and/or implemented in any other way. Further, the example configuration identifier 122, the example configuration database 124, the example connectivity determiner 126 and/or, more generally, the example system 1700 of FIG. 17 may be implemented by hardware, software, firmware and/or any combination of hardware, software and/or firmware. Thus, for example, any of the example configuration identifier 122, the example configuration database 124, the example connectivity determiner 126 and/or, more generally, the example system 1700 of FIG. 17 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example configuration identifier 122, the example configuration database 124, and/or the example connectivity determiner 126 are hereby expressly defined to include a tangible computer readable medium such as a memory, DVD, CD, Blu-ray, etc. storing the software and/or firmware. Further still, the example configuration identifier 122, the example configuration database 124, and/or the example connectivity determiner 126 of FIG. 17 may include one or more elements, processes and/or devices in addition to, or instead of, those illustrated in FIG. 17, and/or may include more than one of any or all of the illustrated elements, processes and devices.

Figure 18:
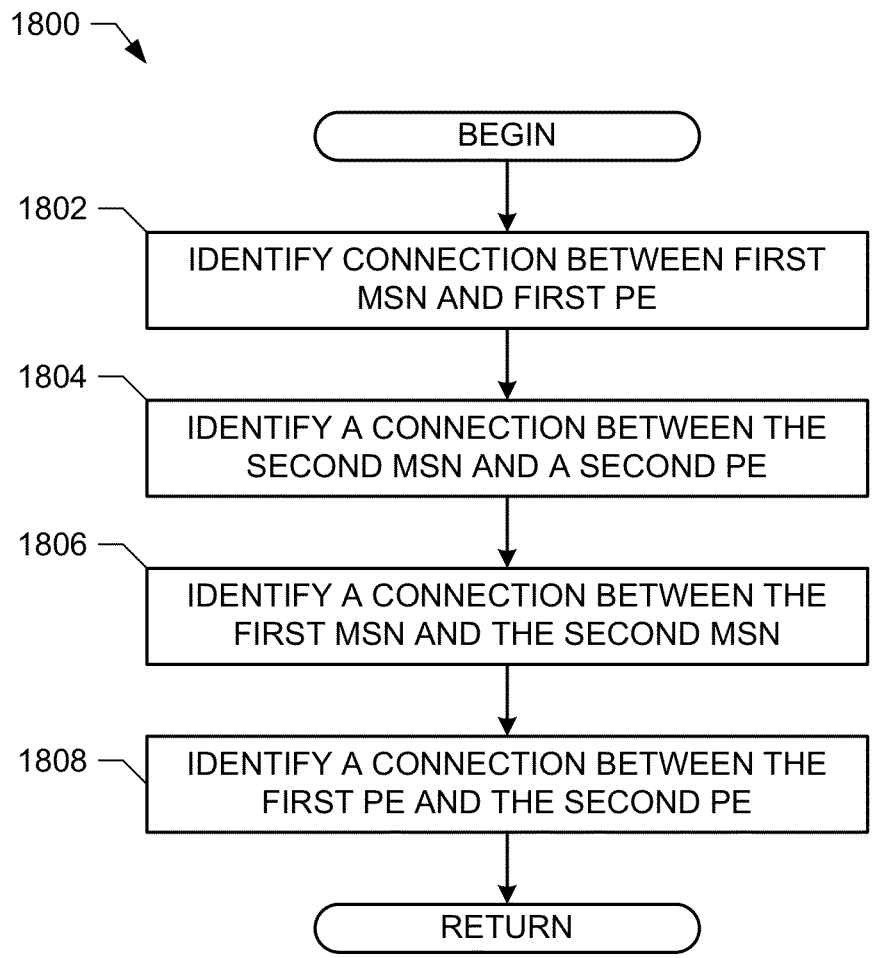
FIG. 18 is a flowchart representative of example machine readable instructions that may be executed in conjunction with the example instructions of FIG. 3 to determine a connectivity of a NodeB and a radio network controller.

The example instructions 1800 of FIG. 18 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). Additionally or alternatively, the example processes of FIG. 18 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

A flowchart representative of example machine readable instructions for implementing the configuration identifier 122, the configuration database 124, and/or the connectivity determiner 126 of FIG. 17 is shown in FIG. 18. In this example, the machine readable instructions comprise a program for execution by a processor such as the processor 1912 shown in the example processor platform 1900 discussed below in connection with FIG. 19. The program may be embodied in software stored on a tangible computer readable medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIG. 18, many other methods of implementing the configuration identifier 122, the configuration database 124, and/or the connectivity determiner 126 of FIG. 17 may alternatively be used. For example, the order of execution of the blocks may be changed, and/or some of the blocks described may be changed, eliminated, or combined.

FIG. 18 is a flowchart representative of example machine readable instructions 1800 that may be performed in conjunction with the example instructions 300 of FIG. 3 to determine a connectivity of a NodeB (e.g., the NodeB 102 of FIG. 1) and an RNC (e.g., the RNC 104 of FIG. 1). In some examples, the configuration identifier 122 of FIG. 17 performs the instructions 1800 after performing block 310 and before performing block 312 of FIG. 3 when the RNC 104 is positioned within the system 100 at least a threshold physical or logical distance from the NodeB 102. For example, if the NodeB 102 is associated with a different region than the RNC 104 such that omitting the instructions 1800 of FIG. 18 would result in an incomplete and/or inaccurate end-to-end connectivity determination, the configuration identifier 122 may perform the instructions 1800 to obtain the complete and accurate end-to-end connectivity between the NodeB 102 and the RNC 104. In some such examples, the configuration identifier 122 determines the connection between the SIAD 106 and the first MSN-Z 118 in block 306 and determines the connection between the RNC 104 and the second MSN-B 1708 in block 308 of FIG. 3.

The example configuration identifier 122 of FIG. 17 identifies a connection between a first MSN (e.g., the MSN-Z 118 of FIG. 17) and a first PE (e.g., the PE 1702) (block 1802). For example, the configuration identifier 122 may determine the connection by determining a PE having a CLLI code that is the closest match to the CLLI code of the MSN-Z 118 and/or by determining the PE having a neighboring BGP interface with the MSN-Z 118. In some examples, the configuration identifier 122 may implement block 1802 using the instructions described above with reference to FIGS. 12A and 12B.

The example configuration identifier 122 of FIG. 17 identifies a connection between a second MSN (e.g., the MSN-B 1708 of FIG. 17) and a second PE (e.g., the PE 1706) (block 1804). For example, the configuration identifier 122 may determine the connection by determining a PE having a CLLI code that is the closest match to the CLLI code of the MSN-B 1708 and/or by determining the PE having a neighboring BGP interface with the MSN-B 1708. In some examples, the configuration identifier 122 may implement block 1804 using the instructions described above with reference to FIGS. 12A and 12B.

The configuration identifier 122 of FIG. 17 identifies a connection between the first MSN-Z 118 and the second MSN-B 1706 (e.g., via the CBB 1704) (block 1806). This connection may be determined from the connections determined in blocks 304-310 of FIG. 3 (e.g., the connection between the NodeB 102 and the RNC 104, the connection between the NodeB 102 and the SIAD 106, the connection between the SIAD 106 and the first MSN-Z 118, and the connection between the RNC 104 and the second MSN-B 1708). Using the connections determined in blocks 1802-1806 (e.g., the connection between the first MSN-Z 118 and the first PE 1702, the connection between the second MSN-B 1708 and the second PE 1706, and the connection between the first MSN-Z 118 and the second MSN-B 1708), the example configuration identifier 122 identifies a connection between the first PE 1702 and the second PE 1706 (block 1808). The example instructions 1800 may then end. Control then returns to block 1312 of FIG. 3.

In some examples, the connections determined in blocks 1802-1808 may be stored with the end-to-end pathway (e.g., as intermediate pathways and/or nodes) in the configuration database 124 and/or tested for connectivity by the connectivity determiner 126 in response to a request for the connectivity of the NodeB 102.

Figure 19:
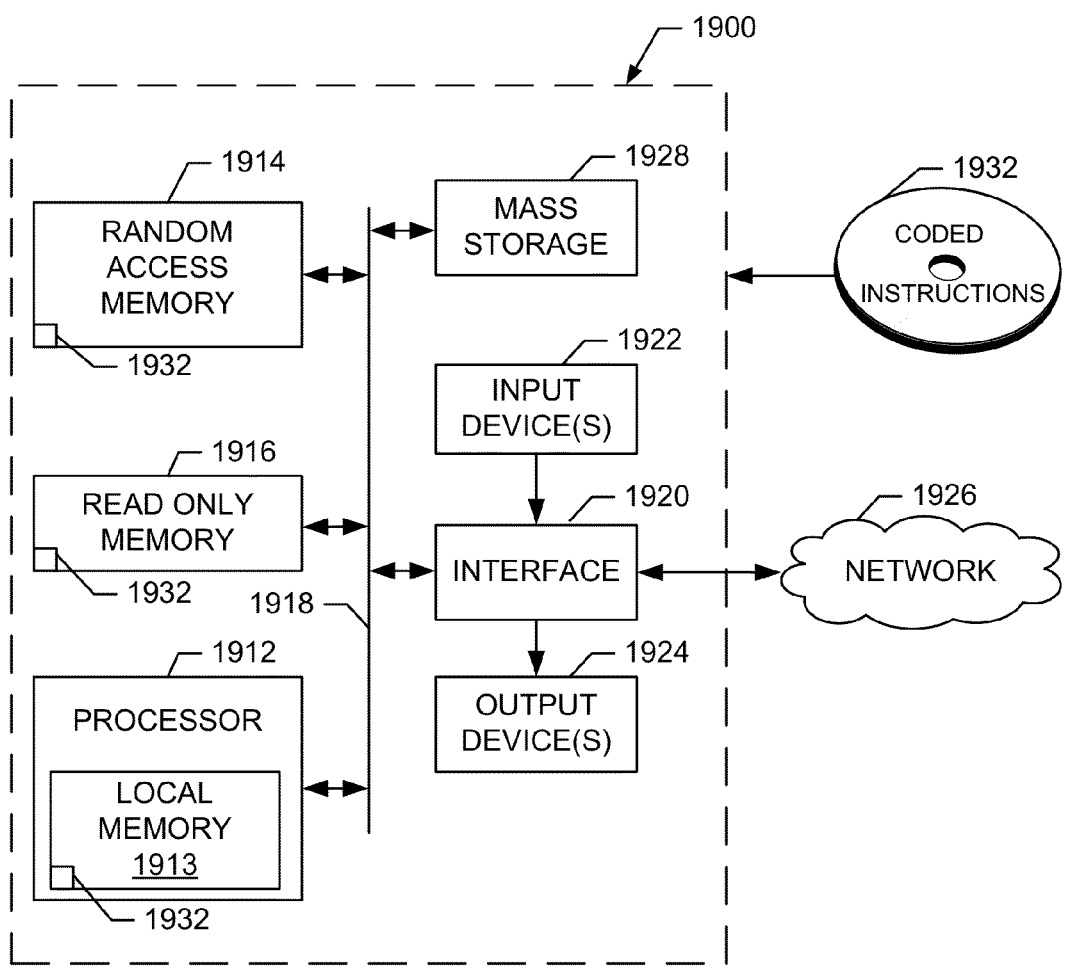
FIG. 19 is a block diagram of an example processor platform capable of executing the instructions of FIGS. 3-13, 15-16, and/or 18 to implement the configuration identifier, the configuration database, and/or the connectivity determiner of FIGS. 1, 2, 14, and/or 17.

FIG. 19 is a block diagram of an example processor platform 1900 capable of executing the instructions of FIGS. 3-13, 15-16, and/or 18 to implement the configuration identifier 122, the configuration database 124, and/or the connectivity determiner 126 of FIGS. 1, 2, 14, and/or 17. The processor platform 1900 can be, for example, a server, a personal computer, or any other type of computing device.

The processor platform 1900 of FIG. 19 includes a processor 1912. For example, the processor 1912 can be implemented by one or more microprocessors or controllers from any desired family or manufacturer.

The processor 1912 includes a local memory 1913 (e.g., a cache) and is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 also includes an interface circuit 1920. The interface circuit 1920 may be implemented by any type of interface standard, such as an Ethernet interface, a universal serial bus (USB), and/or a PCI express interface.

One or more input devices 1922 are connected to the interface circuit 1920. The input device(s) 1922 permit a user to enter data and commands into the processor 1912. The input device(s) can be implemented by, for example, a keyboard, a mouse, a touchscreen, a track-pad, a trackball, isopoint and/or a voice recognition system.

One or more output devices 1924 are also connected to the interface circuit 1920. The output devices 1924 can be implemented, for example, by display devices (e.g., a liquid crystal display, a cathode ray tube display (CRT), a printer and/or speakers). The interface circuit 1920, thus, typically includes a graphics driver card.

The interface circuit 1920 also includes a communication device such as a modem or network interface card to facilitate exchange of data with external computers via a network 1926 (e.g., an Ethernet connection, a digital subscriber line (DSL), a telephone line, coaxial cable, a cellular telephone system, etc.).

The processor platform 1900 also includes one or more mass storage devices 1928 for storing software and data. Examples of such mass storage devices 1928 include floppy disk drives, hard drive disks, compact disk drives and digital versatile disk (DVD) drives. The mass storage device 1928 may implement the configuration database 124 of FIGS. 1, 2, 14, and/or 17.

The coded instructions 1932 of FIGS. 3-13, 15-16, and 18 may be stored in the mass storage device 1928, in the volatile memory 1914, in the non-volatile memory 1916, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to determine connectivity of an eNodeB and a provider edge router, comprising:
   based on a first Internet protocol address from a configuration of an integrated access device, determining, with a processor, a virtual circuit communicatively coupling the integrated access device and a first mobile service node serving the eNodeB;
   filtering a set of mobile service nodes based on a second Internet protocol address of the virtual circuit, the set of mobile service nodes including the first mobile service node;
   when a plurality of the mobile service nodes in the set are identified from the filtering, comparing, with the processor, a first common language location identifier code of the integrated access device to respective common language location identifier codes of the plurality of the mobile service nodes to identify a connection between the integrated access device and the first mobile service node;
   identifying, with the processor, the provider edge router serving the eNodeB via the integrated access device and the first mobile service node;
   identifying, with the processor, a set of intermediate nodes forming a pathway between the integrated access device and the first mobile service node; and
   storing information representative of the pathway including identifiers of the eNodeB and the provider edge router.

2. The method as defined in claim 1, further including determining a connectivity between the eNodeB and the provider edge router by testing at least one of the intermediate nodes or the pathway between the eNodeB and the provider edge router.

3. The method as defined in claim 1, wherein identifying the provider edge router includes comparing one of the respective common language location identifier codes that corresponds to the first mobile service node to a second common language location identifier code of the provider edge router.

4. The method as defined in claim 1, wherein identifying the provider edge router comprises determining whether the first mobile service node and the provider edge router are border gateway protocol neighbors.

5. The method as defined in claim 4, wherein identifying the provider edge router further includes determining whether the first mobile service node includes a summary route that maps an address of the eNodeB.

6. The method as defined in claim 4, wherein identifying the provider edge router further includes determining whether the provider edge router is configured to advertise an IP address of the eNodeB.

7. The method as defined in claim 1, further including:
  determining a second connection between the eNodeB and a serving gateway by querying a domain name server based on a tracking area code of the eNodeB; and
  storing information representative of the second connection between the eNodeB and the serving gateway.

8. The method as defined in claim 1, wherein identifying the integrated access device serving the eNodeB includes determining a second connection between the eNodeB and the integrated access device by selecting the integrated access device and comparing the first Internet protocol address to a third Internet protocol address in the configuration of the eNodeB.

9. The method as defined in claim 1, wherein identifying the set of intermediate nodes includes identifying a second connection between the integrated access device and network termination equipment by comparing the first common language location identifier code to a second common language location identifier code of the network termination equipment.

10. The method as defined in claim 1, wherein identifying the set of intermediate nodes includes identifying a second connection between network termination equipment and an Ethernet aggregation node by comparing a first virtual network connection from a first configuration of the network termination equipment to a second virtual network connection from a second configuration of the Ethernet aggregation node.

11. An apparatus, comprising:
  a processor; and
  a memory including computer readable instructions which, when executed, cause the processor to perform operations including:
    based on a first Internet protocol address from a configuration of an integrated access device, determining a virtual circuit communicatively coupling the integrated access device and a first mobile service node serving an eNodeB;
    filtering a set of mobile service nodes based on a second Internet protocol address of the virtual circuit, the set of the mobile service nodes including the first mobile service node;
    when a plurality of the mobile service nodes in the set are identified from the filtering, comparing a first common language location identifier code of the integrated access device to respective common language location identifier codes of the plurality of the mobile service nodes to identify a connection between the integrated access device and the first mobile service node;
    identifying a provider edge router serving the eNodeB via the integrated access device and the first mobile service node;
    identifying a set of intermediate nodes forming a pathway between the integrated access device and the first mobile service node; and
    storing information representative of the pathway including identifiers of the eNodeB and the provider edge router.

12. The apparatus as defined in claim 11, wherein the operations further include determining connectivity between the eNodeB and the provider edge router by testing at least one of the intermediate nodes or the pathway between the eNodeB and the provider edge router.

13. The apparatus as defined in claim 11, wherein the operations further include:
  determining a second connection between the eNodeB and a serving gateway by querying a domain name server based on a tracking area code of the eNodeB; and
  storing information representative of the second connection between the eNodeB and the serving gateway.

14. A tangible computer readable storage medium including computer readable instructions which, when executed, cause a processor to perform operations comprising:
  based on a first Internet protocol address from a configuration of an integrated access device, determining a virtual circuit communicatively coupling the integrated access device and a first mobile service node serving an eNodeB;
  filtering a set of mobile service nodes based on a second Internet protocol address of the virtual circuit, the set of mobile service nodes including the first mobile service node;
  when a plurality of the mobile service nodes in the set are identified from the filtering, comparing a first common language location identifier code of the integrated access device to respective common language location identifier codes of the plurality of the mobile service nodes to identify a connection between the integrated access device and the first mobile service node;
  identifying a provider edge router serving the eNodeB via the integrated access device and the first mobile service node;
  identifying a set of intermediate nodes forming a pathway between the integrated access device and the first mobile service node; and
  storing information representative of the pathway including identifiers of the eNodeB and the provider edge router to thereby identify the provider edge router serving the eNodeB via the integrated access device and the first mobile service node.

15. The tangible computer readable storage medium as defined in claim 14, wherein the operations further include determining connectivity between the eNodeB and the provider edge router by testing at least one of the intermediate nodes or the pathway between the eNodeB and the provider edge router.

16. The tangible computer readable storage medium as defined in claim 14, wherein the instructions are further to cause the processor to perform operations including:
  determining a second connection between the eNodeB and a serving gateway by querying a domain name server based on a tracking area code of the eNodeB; and
  storing information representative of the second connection between the eNodeB and the serving gateway.

* * * * *